(12) United States Patent
Jansen

(10) Patent No.: US 10,894,858 B2
(45) Date of Patent: Jan. 19, 2021

(54) RADIATION CURABLE COMPOSITIONS FOR COATING OPTICAL FIBER WITH ENHANCED HIGH-SPEED PROCESSABILITY

(71) Applicant: DSM IP Assets B.V., TE Heerlen (NL)

(72) Inventor: Johan Franz Gradus Antonius Jansen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/878,658

(22) Filed: May 20, 2020

(65) Prior Publication Data

US 2020/0369822 A1 Nov. 26, 2020

(30) Foreign Application Priority Data

| May 24, 2019 | (EP) | 19176572 |
| May 24, 2019 | (EP) | 19176578 |
| May 24, 2019 | (EP) | 19176579 |
| May 24, 2019 | (EP) | 19176583 |

(51) Int. Cl.

| C08G 18/76 | (2006.01) |
| C08G 18/73 | (2006.01) |
| C08G 18/75 | (2006.01) |
| C08G 18/32 | (2006.01) |
| C08F 290/14 | (2006.01) |
| C08F 2/48 | (2006.01) |
| C08K 5/101 | (2006.01) |

(52) U.S. Cl.
CPC .............. *C08G 18/765* (2013.01); *C08F 2/48* (2013.01); *C08F 290/147* (2013.01); *C08G 18/3206* (2013.01); *C08G 18/3215* (2013.01); *C08G 18/73* (2013.01); *C08G 18/753* (2013.01); *C08G 18/7621* (2013.01); *C08G 18/7642* (2013.01); *C08K 5/101* (2013.01)

(58) Field of Classification Search
CPC .... C08F 2/48; C08F 290/147; C08G 18/3206; C08G 18/3215; C08G 18/73; C08G 18/753; C08G 18/7621; C08G 18/765; C08G 18/7642; C08K 5/101
See application file for complete search history.

(56) References Cited

U.S. PATENT DOCUMENTS

| 5,036,113 | A | 7/1991 | Boon |
| 5,804,311 | A | 9/1998 | Suwa |
| 5,822,489 | A | 10/1998 | Hale |
| 5,847,021 | A | 12/1998 | Tortorello |
| 6,951,623 | B2 * | 10/2005 | Wu .......................... C23F 1/02 205/122 |
| 2003/0021943 | A1 * | 1/2003 | Takase ................... C08G 18/48 428/65.2 |
| 2003/0091310 | A1 | 5/2003 | Myers |
| 2008/0125546 | A1 * | 5/2008 | Yamaguchi ............. C08L 75/16 525/123 |
| 2012/0065336 | A1 | 3/2012 | Mizori |
| 2015/0328086 | A1 | 11/2015 | Fornof et al. |
| 2018/0079919 | A1 * | 3/2018 | Steert ..................... C09D 11/32 |
| 2018/0282550 | A1 | 10/2018 | Burgess |

FOREIGN PATENT DOCUMENTS

| EP | 1002817 | 5/2000 |
| JP | H0718038 | 1/1995 |
| JP | H0718038 A | 1/1995 |
| JP | H1160657 | 3/1999 |
| JP | H1160657 A | 3/1999 |
| WO | WO9910443 A1 | 3/1999 |
| WO | WO2016028668 | 2/2016 |
| WO | WO2018219729 A1 | 12/2018 |
| WO | WO2018220605 A1 | 12/2018 |
| WO | 2020222973 A1 | 11/2020 |

OTHER PUBLICATIONS

Current Status of Urethane (Meth)Acrylate Oligomers and Polymers, Journal of Macromolecular Science, vol. C33, No. 2, May 1, 1993, pp. 147-180.
UV-curable low-surface-energy fluorinated poly(urethane-acrylate)s for biomedical applications, European Polymer Journal, vol. 44, No. 9, Sep. 1, 2008, pp. 2927-2937.

* cited by examiner

*Primary Examiner* — Patrick D Niland

(74) *Attorney, Agent, or Firm* — Daniel S. Bujas

(57) ABSTRACT

Radiation curable compositions for coating optical fibers are disclosed herein. In an embodiment, a radiation curable composition includes a reactive oligomer component, wherein a portion of the polymerizable groups of the reactive oligomer component include methacrylate groups; a reactive diluent monomer component, wherein a portion of the polymerizable groups of the reactive diluent monomer component include acrylate groups, acrylamide groups, or N-vinyl amide groups, or combinations thereof; a photoinitiator component, and an optional additive component. Also described are methods of coating the radiation curable compositions elsewhere described, and the fiber optic coatings and cables resulting therefrom.

30 Claims, 9 Drawing Sheets

Section A-A

# RADIATION CURABLE COMPOSITIONS FOR COATING OPTICAL FIBER WITH ENHANCED HIGH-SPEED PROCESSABILITY

TECHNICAL FIELD

The present invention relates generally to methods of coating optical fibers, the radiation curable coatings suitable for use on optical fibers that are manufactured using high-speed, low-helium, and/or high temperature drawing, and the optical fibers produced therefrom.

CROSS REFERENCE TO RELATED APPLICATIONS

This application claims priority to European patent application Nos. EP19176579.1, EP19176572.6, EP19176578.3, and EP19176583.3, each of which was filed on 24 May 2019, and each of which is hereby incorporated by reference in its entirety as if fully set forth herein.

BACKGROUND

Optical fibers have been used in a variety of applications and have several advantages over other media. For example, data can be transmitted over optical fibers at a higher data rate than over wires. Optical fibers are also lighter and more flexible than wires. Thus, optical fibers, especially those made from glass, are often used in the telecommunication industry for data transmission. However, if left unprotected, optical fibers are unsuitable for field use because of the fragility of the thin glass strand across which optical signals are transmitted. In addition to their susceptibility to physical damage, uncoated optical fibers would also be negatively impacted by moisture contact. As a result, surface coatings have long-since been applied to optical fibers for protection and to ensure a high-level of performance.

It is well known to draw glass fibers from a specially prepared, cylindrical preform which has been locally and symmetrically heated to a temperature of, e.g., about 2000° C. As the preform is heated, such as by feeding the preform into and through a furnace, a glass fiber is drawn from the molten material. The surface coating compositions are applied to the glass fiber after it has been drawn from the preform, preferably immediately after cooling. The coating compositions are then cured to produce the coated optical fiber. General methods of applying dual layers of coating compositions to a moving glass fiber are well-known in the art, and are disclosed in U.S. Pat. No. 4,474,830 to Taylor and U.S. Pat. No. 4,851,165 to Rennell et al. Newer fiber design concepts can be found in U.S. Pat. No. 8,837,892, US 2014/0294355, and US 2015/0071595.

To protect them, optical fibers are frequently coated with two or more superposed radiation-curable coatings immediately after the fiber is produced by drawing. By "radiation-curable," it is meant that radiation is required to initiate crosslinking of the composition, such as from a liquid (uncured) to solid (cured) state.

Typically, radiation curable optical fiber coatings are the cured product of a composition containing a mixture of one or more components possessing one or more ethylenically unsaturated (C=C) bonds which, under the influence of irradiation, undergo crosslinking by free-radical polymerization. Such composition also typically includes a photoinitiator to assist in the radiation curing, particularly if the curing is effectuated by means of irradiation at ultraviolet (UV) wavelengths.

The coating which directly contacts the optical fiber is called the "inner primary coating" and an overlaying coating is called the "outer primary coating." In some references, the inner primary coating is also called simply the "primary coating" and the outer primary coating is called a "secondary coating." Inner primary coatings are typically formulated to possess a significantly lower modulus than secondary coatings.

The relatively soft primary coating provides resistance to microbending which results in added attenuation of the signal transmission (i.e. signal loss) of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating thickness decreases the amount of protection provided decreases. The relationship between coatings and protection from lateral stress that leads to microbending is discussed, for example, in D. Gloge, "Optical-fiber packaging and its influence on fiber straightness and loss", *Bell System Technical Journal*, Vol. 54, 2, 245 (1975); W. B. Gardner, "Microbending Loss in Optical Fibers", Bell System Technical Journal, Vol. 54, No. 2, p. 457 (1975); J. Baldauf, "Relationship of Mechanical Characteristics of Dual Coated Single Mode Optical Fibers and Microbending Loss", *IEICE Trans. Commun.*, Vol. E76-B, No. 4, 352 (1993); and K. Kobayashi, "Study of Microbending Loss in Thin Coated Fibers and Fiber Ribbons", IWCS, 386 (1993). The harder secondary coating, meanwhile, provides resistance to handling forces such as those encountered when the coated fiber is ribboned and/or cabled.

Optical fiber secondary coating compositions generally comprise, before cure, a mixture of ethylenically-unsaturated compounds, consisting of one or more acrylate-functional oligomers dissolved or dispersed in liquid ethylenically-unsaturated diluents and photoinitiators. The coating composition is typically applied to the optical fiber in liquid form and then exposed to actinic radiation to effect cure.

Primary coatings preferably possess a higher refractive index than the cladding of the associated optical fiber, in order to allow them to strip errant optical signals away from the core of the optical fiber. Primary coatings should maintain adequate adhesion to the glass fiber during thermal and hydrolytic aging, yet (if needed) is capable of being strippable therefrom for splicing purposes. The primary coating typically has a thickness in the range of 20-50 μm (e.g., about 25 or 32.5 μm), thinner thickness in the range of 15-25 μm for 200 μm fibers.

The primary coating typically has a thickness that is less than about 40 μm, although other thicknesses may be used. The primary coating is typically applied to the glass fiber and subsequently cured. Various additives that enhance one or more properties of the primary coating can also be present, including antioxidants, adhesion promoters, inhibitors, photosensitizers, carrier surfactants, tackifiers, catalysts, stabilizers, surface agents, and optical brighteners.

Secondary coatings are the outer coatings. The secondary coating is, for example, the polymerization product of a coating composition whose molecules become highly cross-linked when polymerized. The secondary coating typically has a high in situ modulus (e.g., greater than about 800 MPa at 25° C., more preferably from between about 1 GPa to about 3 GPa) and a high $T_g$ (e.g., greater than about 50° C.). The in situ secondary modulus is preferably greater than about 1000 MPa. Secondary coatings often possess a thickness that is less than about 40 µm.

Fiber optic coatings, including the primary and secondary layers, typically are applied using one of two processes: wet-on-wet (WOW) and wet-on-dry (WOD). In the WOD process, the fiber passes first through a primary coating application, which is cured via exposure to ultraviolet (UV) radiation. The fiber then passes through a secondary coating application, which is subsequently cured by similar means. In the WOW process, the fiber passes through both the primary and secondary coating applications, whereupon the fiber proceeds to the curing step. In a wet-on-wet process, the curing lamps between primary and secondary coating application are omitted.

Radiant light energy is used in the manufacture of radiation curable coatings for optical fibers. In particular, curing processes use radiant energy from UV lamps to cure optical fiber coatings. UV lamps with broadband mercury spectra are commonly used in the industry, due to their high intensity and broad emission spectrum to ensure rapid and full cure of such radiation curable coatings. Increasingly, curing systems utilizing UV-LED (light emitting diodes) lamps have begun to be used as well, as their efficient construction enables a fiber production process with a reduced energy input.

The global demand for optical fiber continues to increase year-on-year. In order to meet this increasing demand, and also to provide a productivity advantage in such a competitive industry, it would be beneficial to increase, among other things, the speed at which an optical fiber is formed, coated, and cured. Current coating and process technology has enabled most fiber producers to operate draw towers comfortably at line speeds of at least 1000 m/min, with speeds of up to 1500 m/min and even 2500 m/min and higher also possible.

However, as the fiber draw speed increases, several technical challenges are introduced into the process, thereby increasing the difficulty by which a suitably coated optical fiber may be produced. Among these technical challenges include a reduction in the ability of the UV light source to impart sufficient doses of radiation to fully cure the primary and secondary coating compositions due to the reduced relative exposure time. Further challenges include an increased tendency for runout or concentricity errors in the application of the coated fiber, as vibrations characterized by higher line speeds could induce physical movement beyond the precise coating application tolerances. Yet additional challenges include bubble entrapment, coating delamination, and increased microbend-induced attenuation.

Many of these challenges are induced or exacerbated by the fact that, at higher line speeds, the freshly applied liquid coating simply cannot cure quickly enough to form a coating with sufficient integrity or adhesion (whether to the glass or a previously-applied coating layer). The increased temperatures induced by higher line speeds further retard the cure kinetics of known compositions. Although commercial acrylate-functionalized coatings are designed to cure quickly, the coating cure is still often the rate-limiting step to increasing optical fiber production. Therefore, additional solutions to further improve the cure speed of radiation curable optical fiber coatings are needed.

Attempts to provide optical fiber coatings which are more suitable for the increased processing demands are known. WO2018220605A1, assigned to DSM IP Assets B.V., describes novel coatings with acrylate-functionalized reactive oligomers and acrylate-functionalized reactive diluent monomers which are configured to cope with the added thermal stresses induced by increased line speeds in that such coatings exhibit improved rheological properties.

Despite this, a need continues to exist to provide optical fiber coatings, especially primary coatings, which form sufficiently crosslinked networks quickly enough to cope with the increased demands placed upon such systems after application and coating onto an optical fiber at ever-increasing line speeds, and which do not necessarily require increased amounts of expensive photosensitizers, photoinitiators, or other exotic additives. Also, a need continues to exist to provide optical fiber coatings which exhibit high rates of cure, but also impart desirable properties into the cured coatings produced therefrom, especially contribution to excellent microbend resistance by possessing a low modulus.

BRIEF SUMMARY

Figure 1:
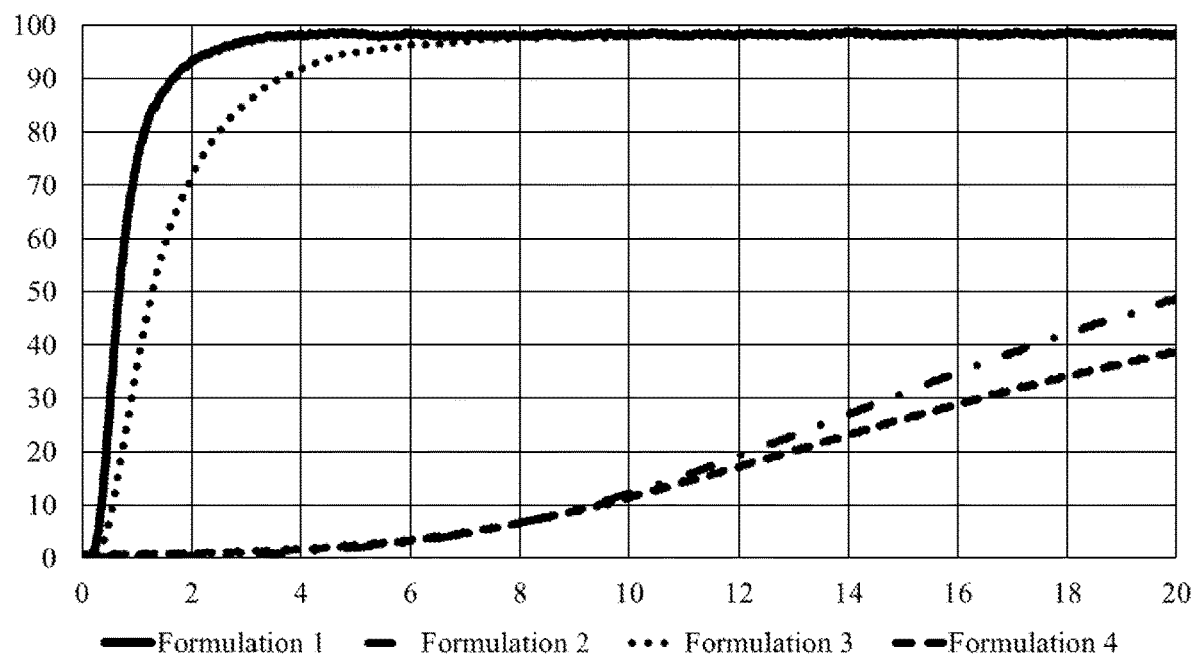
FIG. 1 shows a graph of the relative modulus based on G' max as a function of time for various radiation curable compositions tested herein (formulations 1-4)

Described herein are several aspects and embodiments of the invention. A first aspect is a radiation curable composition for coating an optical fiber including (1) a reactive oligomer component comprising, consisting essentially of, or consisting of at least one reactive urethane oligomer comprising a polymerizable group; wherein at least 20%, preferably at least 30% of a molar fraction of the polymerizable groups in the reactive oligomer component consist of methacrylate groups; (2) a reactive diluent monomer component comprising, consisting of, or consisting essentially of reactive diluent monomers having at least one polymerizable group that is able to (co)polymerize with the polymerizable group(s) of the reactive oligomer component; wherein the reactive diluent monomer component comprises a monofunctional acrylate monomer; and wherein at least 50%, or at least 80%, or at least 90%, or at least 95%, or at least 98%, or at least 99% of a molar fraction of the polymerizable groups of the reactive diluent monomer component consist of acrylate groups, acrylamide groups, N-vinyl amide groups, or mixtures thereof; (3) a photoinitiator component; and (4) optionally, an additive component.

According to other embodiments of the first aspect, the reactive oligomer is the reaction product of a polyol, diisocyanate, and a hydroxyl-functional compound having at least one methacryloyl group, and optionally a compound having a hydroxyl group and no polymerizable group. In still further embodiments according to the first aspect, the reactive oligomer and/or reactive oligomer component possess prescribed molecular weight values, determined either via theoretical molecular weight or number average molecular weight. In various embodiments of the first aspect, the reactive oligomer may be single-endcapped, multi-endcapped, or be partially endcapped with a hydroxyl group. The polymerizable groups may occur as polymerizable endgroups or polymerizable backbone groups, or both. In still further embodiments, the polymerizable groups of the reactive oligomer possess prescribed amounts and/or ratios of methacrylate groups, and the polymerizable groups of the reactive diluent monomer possess prescribed amounts and/or ratios of acrylate groups. Additionally, the compounds from which the polymerizable groups are formed possess prescribed reactivity ratios.

A second aspect of the current invention is a method for coating an optical fiber, comprising providing a glass optical fiber; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition is a composition according to any of the embodiments of the first aspect of the current invention.

Another embodiment of the second aspect describes optical fiber coating processes wherein the primary coating composition is applied onto the surface of the glass optical fiber at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min.

A third aspect of the current invention is a coated optical fiber, the coated optical fiber comprising a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to this third aspect, the primary coating layer is a cured product of a radiation curable composition according to any of the embodiments of the first aspect, and the primary and secondary coatings are applied and cured according to any of the embodiments of the second aspect.

DETAILED DESCRIPTION

A first aspect of the current invention is a radiation curable composition for coating an optical fiber comprising:

a reactive oligomer component comprising, consisting essentially of, or consisting of at least one reactive urethane oligomer comprising a polymerizable group; wherein at least 20%, preferably at least 30% of a molar fraction of the polymerizable groups in the reactive oligomer component consist of methacrylate groups;

a reactive diluent monomer component comprising, consisting of, or consisting essentially of reactive diluent monomers having at least one polymerizable group that is able to (co)polymerize with the polymerizable group(s) of the reactive oligomer component; wherein the reactive diluent monomer component comprises a monofunctional acrylate monomer; and wherein at least 50%, or at least 80%, or at least 90%, or at least 95%, or at least 98%, or at least 99% of a molar fraction of the polymerizable groups of the reactive diluent monomer component consist of acrylate groups, acrylamide groups, N-vinyl amide groups, or mixtures thereof;

a photoinitiator component; and optionally, an additive component.

Radiation curable compositions for coating optical fibers according to the first aspect of the present invention contain a reactive oligomer component, a reactive diluent monomer component, a photoinitiator component, and optionally, an additive component. In a preferred embodiment, the radiation curable composition for coating an optical fiber according to the first aspect of the present invention consists of a reactive oligomer component, a reactive diluent monomer component, a photoinitiator component, and optionally, one or more additives. Such components described below may be used in radiation curable compositions according to any of the aspects of the present invention, including compositions according to the first aspect, compositions used in methods of coating an optical fiber according to the second aspect, and compositions from which the coatings described in association with coated optical fibers according to the third aspect are cured.

Reactive Oligomer Component

Radiation curable compositions according to the present invention comprise a reactive oligomer component. As used herein, "reactive" means the ability to form a chemical reaction, preferably a polymerization reaction, with another molecule. As such, a reactive compound will be said to possess at least one reactive, or functional group. It is preferred that such reactive or functional group is a polymerizable group. An oligomer, meanwhile, is used herein to mean a molecule of intermediate relative molecular mass, the structure of which comprises a plurality of units derived, actually or conceptually, from molecules of lower relative molecular mass. As used herein, a component is considered an oligomer if it further possesses a number average molecular weight (Mn) from about 1000 g/mol to about 35,000 g/mol, as measured by size exclusion chromatography (SEC). In a preferred embodiment, the reactive oligomer component consists of one or more reactive oligomers having an Mn from 1000 g/mol to 30,000 g/mol, or from 800 g/mol to 25,000 g/mol, or from 1000 g/mol to 20,000 g/mol.

In a preferred embodiment, the reactive oligomer component comprises a plurality of individual reactive oligomer molecules. In an embodiment, the reactive oligomer component consists of, or consists essentially of, a plurality of reactive oligomer molecules, wherein each molecule possesses the same, or substantially the same chemical structure. In an alternative embodiment, the reactive oligomer component consists of a plurality of reactive oligomer molecules having different chemical structures. In an embodiment, the reactive oligomer component consists of reactive oligomers of 2, or more than 2 different types.

The reactive oligomer component according to the invention comprises, consists essentially of, or consists of at least one reactive oligomer having at least one polymerizable group. In a preferred embodiment, the reactive oligomer component consists of reactive oligomers having at least one polymerizable group. The polymerizable groups may be of any known type. In an embodiment, however, the polymerizable group may comprise, consist essentially of, or consist of acrylate, methacrylate, acrylamide, or N-vinyl amide groups, or any combination thereof. Among N-vinyl amide groups, N-vinyl caprolactams are preferred. The reactive oligomers are preferably ethylenically unsaturated polymerizable compounds that contain one or more than one reactive olefinic double bond.

The polymerizable groups may occur at any feasible point along the length of the reactive oligomer, including as polymerizable backbone groups or polymerizable end-groups. Polymerizable backbone groups are present along, or branch from, a linear chain along the length of the oligomer, whereas polymerizable endgroups are polymerizable groups that are present at the terminus of the oligomer. The polymerizable groups may occur in isolation from, or directly or indirectly adjacent to other polymerizable groups, such as in a branched or forked pattern at the terminus of an oligomer, for example. In an embodiment, the polymerizable groups comprise, consist essentially of, or consist of polymerizable endgroups. In an alternative embodiment, the polymerizable groups comprise a mixture of polymerizable endgroups and polymerizable backbone groups.

In a preferred embodiment, the polymerizable groups are derived from the reaction products of constituent hydroxy-functional monomers with reactive moieties, such as a methacrylic moiety. In an embodiment, the hydroxy-functional monomers are chosen so as to possess desired reactivity ratios. As used herein unless otherwise specified, the reactivity ratio is determined from a theoretical monomer mix of the hydroxy-functional monomer from which the polymerizable group is derived with 2-hydroxyethyl acrylate (CAS Number 818-61-1). As is known in the art to which this invention applies, in determining reactivity ratios, the May-Lewis equation may be employed to consider the four different reactions that could theoretically take place at the reactive chain and terminating in either of the two monomers with known reaction rate constants. Then, the reactivity ratio is the ratio of the rate constant for addition of the hydroxy-functional monomer from which the polymerizable group is derived for addition to the chosen standard of 2-hydroxyethyl acrylate.

In embodiment, the compound that is a hydroxy-functional monomer with a reactive moiety is selected such that, in a copolymerization between said compound and 2-hydroxyethyl acrylate (HEA), a self-reactivity ratio of said compound ($R_1$) is at least 1, or at least 1.1, or at least 1.2, or at least 1.3, or at least 1.4, or at least 1.5, or at least 1.6, or at least 2, or at least 2.9; between 1 and 3, or between 1 and 2, or between 1.01 and 1.8, or between 1.1 and 1.7, or between 1.2 and 1.6, or between 1.3 and 1.5. Furthermore, the compound is selected such that, in the same copolymerization with HEA, a reactivity ratio of said compound with HEA ($R_2$) is from 0.1 to 0.5, or from 0.1 to 0.4, or from about 0.15 to about 0.35. The ratios of $R_1/R_2$ may be, for example, from 3 to 15, or from 3 to 12, or from 3 to 11, or from 4 to 15, or from 4 to 10, or from 5 to 12. In such embodiments, $R_1$ and $R_2$ may be determined according to multivariate analysis using the infrared spectra of the copolymer input compounds. In a preferred embodiment, the compound that is a hydroxy-functional monomer with a reactive moiety possesses at least one methacryloyl group.

The reactivity ratios for many hydroxy-functional monomers are well known in the art and a large list can be found in J. Brandrup, E, H, Immergut, E. A. Grulke (eds), *Polymer Handbook*. Currently one of the best empirical methods to determine reactivity ratios is via a pulse laser polymerization-size exclusion chromatography-mass spectrometry (PLP-SEC-MS) method, with as MS method either electron spray of matrix assisted laser desorption ionization (MALDI-TOF). For compounds with IR signals which can be separated, the method described in Jansen et al.: *Real-Time Infrared Determination of Photoinitiated Copolymerization Reactivity Ratios: Application of the Hilbert Transform and Critical Evaluation of Data Analysis Techniques*; Macromolecules 2004, 37, 2275-2286 (2004), is also considered suitable, as it is an adequate mimic of the UV polymerization process. It is preferred that nature of the RT-FTIR analysis performed is multivariate and is combined with the NLLS methodology for the reactivity ratio analysis.

Reactive oligomers according to the present invention may be of any known type consistent with the definitions specified elsewhere herein. In a preferred embodiment, however, the reactive oligomer component comprises, consists essentially of, or consists of one or more urethane-based reactive oligomers. A urethane-based reactive oligomer, which is referred to herein also as a "reactive urethane oligomer", preferably comprises a backbone, a urethane group, and a polymerizable group. In a preferred embodiment, the urethane-based oligomer comprises a urethane methacrylate oligomer. A urethane methacrylate oligomer is preferably the reaction product of a polyol compound, a diisocyanate compound, and a hydroxyl-group containing methacrylate compound.

Examples of suitable polyol compounds include polyether polyols, polyester polyols, polycarbonate polyols, polycaprolactone polyols, acrylic polyols, and other polyols. These polyols may be used either individually or in combinations of two or more. In a preferred embodiment, the backbone of the urethane-based reactive oligomer comprises a compound derived from a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In a preferred embodiment, the particular block refers to a polyether block, which is derived from one or more of the polyols, preferably polyether polyols, described elsewhere herein. In an embodiment, the block to which a mono-, di-, and/or tri-block copolymer refers is a polyether block which is derived from one or more of the polyols described elsewhere herein. In an embodiment, a monoblock copolymer may be described as a copolymer having only an average of around 1, or from about 0.9 to less than 1.5 units of a particular block, such as a polyether block. In an embodiment, a diblock copolymer may be described as a copolymer having an average of around 2, or from at least 1.5 to less than 2.5 units of a particular block, such as a polyether block. In an embodiment, a triblock copolymer may be described as a copolymer having an average of around 3, or from at least 2.5 to less than 3.5 units of a particular block, such as a polyether block. The number of polyether units in a given oligomer may be determined by the number of polyether polyol molecules utilized in the synthesis of a single oligomer.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. Examples of the polyhydric alcohol include ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like. Examples of the polybasic acid include phthalic acid, dimer acid, isophthalic acid, terephthalic acid, maleic acid, fumaric acid, adipic acid, sebasic acid, and the like.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

Examples of the polycarbonate polyols include, without limitation, polycarbonate of polytetrahydrofuran, poly(hexanediol carbonate), poly(nonanediol carbonate), poly(3-methyl-1,5-pentamethylene carbonate), and the like.

Commercially available products of these polycarbonate polyols include, without limitation, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like.

Polycaprolactone diols, meanwhile, are obtained by reacting e-caprolactone and a diol compound. In an embodiment, polycaprolactone polyols have a melting point of 0° C. or higher. Here, given as examples of the diol compound are ethylene glycol, polyethylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having an alkylene oxide structure in the molecule, in particular polyether polyols, are preferred. In an embodiment, polyols containing polytetramethylene glycol and copolymer glycols of butylene oxide and ethylene oxide are preferred.

The number average molecular weight derived from the hydroxyl number of these polyols is usually from about 50 to about 15,000, and preferably from about 1,000 to about 8,000. As used herein, unless otherwise specified, molecular weight refers to a number average molecular weight, as specified in grams/mol (g/mol), as determined by an SEC method.

The urethane-based reactive oligomer is also preferably the reaction product of a polyisocyanate compound, preferably a diisocyanate compound. Examples of suitable diisocyanates include 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like.

These diisocyanate compounds may be used either individually or in combinations of two or more. Preferred diisocyanates are isophorone diisocyanate, 2,2,4-trimethylhexamethylene diisocyanate, 2,4,4 trimethyl hexamethylene diisocyanate and hexamethylene diisocyanate, 2,4-tolylene diisocyanate, and 2,6-tolylene diisocyanate.

The urethane-based reactive oligomer is also preferably the reaction product of a hydroxyl-group containing (meth)acrylate compound. Examples of the hydroxyl group-containing (meth)acrylate used include, (meth)acrylates derived from (meth)acrylic acid and epoxy and (meth)acrylates comprising alkylene oxides, more in particular, 2-hydroxyethyl (meth)acrylate, 2-hydroxypropyl acrylate, 2-hydroxy-3-oxyphenyl (meth)acrylate, and hydroxyethyl caprolactone acrylate. As is described below, methacrylate compounds are strongly preferred.

Surprisingly, Inventors have presently discovered that compositions incorporating methacrylate functionality, when prescribed as discussed and claimed elsewhere herein, exhibit superior application-specific properties. More specifically, when the reactive oligomer component contains specified amounts of methacrylate-functional polymerizable groups, Inventors have presently and unexpectedly found that compositions according to the present invention form viable optical fiber coatings faster than those derived from the traditionally-prescribed all-acrylate systems. Furthermore, it has been presently observed that such coating compositions achieve this while also facilitating the creation of a cured optical fiber coating having an ultimate modulus that is comparable to, or even lower than, traditional all-acrylate analogues. This has presently been observed to be true despite the instances wherein such coatings are slower-curing, as measured by percent reacted unsaturation (% RAU) when compared to an equivalent all-acrylate composition. Indeed, these results are truly surprising in view of the fact that it is well-established that systems containing acrylic unsaturations are considerably more reactive than those containing methacrylic double bonds (see, e.g., *Radiation Curing in Polymer Science and Technology—Vol. 1: Fundamentals and Methods*, I. Fouassier, J. P. et al., Elsevier Science Publishers Ltd. 1993 at pp. 8-9), and further in that methacrylic unsaturated products are known to be harder and less-flexible than equivalent acrylic products (Id.).

Inventors have surprisingly discovered, therefore, that although compositions including methacrylate-functional reactive oligomers are not necessarily faster-curing by the traditional % RAU metric, they nonetheless build up a sufficiently-high network modulus faster than compositions with reactive oligomers having exclusively acrylate-functional reactive oligomers. This makes such compositions more suitable for high-speed application in optical fiber coating applications, wherein the high line speed and proximity of the next manufacturing operation (whether application of a secondary coating or spooling of the freshly-coated optical fiber) dictate that fast network property build-up is of paramount importance. Inventors' insight in investigating cure speed performance in ways beyond the traditionally-relied upon % RAU methods facilitated the discovery of the presently superior-performing combinations that have heretofore been overlooked despite decades of prior optical fiber coating development.

Therefore, at least some of the polymerizable groups of the reactive oligomers in the reactive oligomer component comprise a methacrylic double bond. In a preferred embodiment, the polymerizable groups of the reactive oligomer comprise methacrylate groups. In a preferred embodiment, at least 10%, or at least 20%, or at least 30%, or at least 33%, or at least 40%, or at least 50%, or at least 60%, or at least 70%, or at least 80%, or at least 90%, or at least 99%, or around 100% of the polymerizable groups of the reactive oligomer component consist of methacrylate groups. In a preferred embodiment, the ratio of methacrylate groups to acrylate groups present in all of the reactive oligomers of the reactive oligomer component is greater than 1:9, or greater than 1:4, or greater than 1:3, or greater than 1:2, or greater than 1:1, or greater than 3:2, or greater than 2:1, or greater than 3:1, or greater than 5:1, or greater than 8:1, or greater than 9:1, or greater than 100:1.

In an embodiment, the polymerizable groups present in the reactive oligomer component consist of, or consist essentially of, methacrylate groups. In another embodiment, when counting only the total number of methacrylate and acrylate groups present in all of the reactive oligomers as polymerizable groups, the reactive oligomer component consists of, or consists essentially of, methacrylate groups.

With respect to the entire composition, meanwhile, in a preferred embodiment, a molar percentage of methacrylate groups present in the composition, out of a total amount of polymerizable groups present in the reactive oligomer component and the reactive diluent monomer component, is from 1% to 20%, or from 1% to 18%, or from 1% to 15%, or from 2% to 20%, or from 2% to 18%, or from 2% to 15%, or from, 4% to 20%, or from 4% to 18%, or from 4% to 15%, or from 9% to 20%, or from 9% to 18%, or from 9% to 15%. In another embodiment, the molar ratio of methacrylate groups to (meth)acrylate groups (i.e. all methacrylate groups and all acrylate groups) is from 2% to 20%, or from 2% to 18%, or from 2% to 15%, or from, 4% to 20%, or from 4% to 18%, or from 4% to 15%, or from 9% to 20%, or from 9% to 18%, or from 9% to 15%.

Various ratios of the compounds used to synthesize reactive oligomers in the reactive oligomer component may be used. With regards to urethane-based reactive oligomers, in an embodiment, the ratio of polyol, diisocyanate, and hydroxyl group-containing (meth)acrylate used for preparing the urethane (meth)acrylate reactive oligomer is determined so that about 1.1 to about 3 equivalents of an isocyanate group included in the diisocyanate and about 0.1 to about 1.5 equivalents of a hydroxyl group included in the hydroxyl group-containing (meth)acrylate are used for one equivalent of a hydroxyl group included in the polyol.

In the reaction of the three components used to create a urethane-based reactive oligomer, a urethanization catalyst is also preferably used. Such catalysts include, by way of an example, copper naphthenate, cobalt naphthenate, zinc naphthenate, di-n-butyl tin dilaurate, triethylamine, and tri-ethylenediamine-2-methyltriethyleneamine. The catalyst may be used in any suitable amount, or for example from about 0.01 to about 1 wt. % of the total amount of the reactant. The reaction may be carried out at any suitable temperature, such as a temperature from about 10 to about 90° C., and preferably from about 30 to about 80° C.

The reactive oligomer component may also include one or more urethane-free reactive oligomers. Examples of urethane-free reactive oligomers include (meth)acrylated acrylic oligomers, urethane-free polyester (meth)acrylate oligomers, and urethane-free alkyd (meth)acrylate oligomers. Other such oligomers that can be used include polyester (meth)acrylate oligomers, epoxy (meth)acrylate oligomers, polyamide (meth)acrylate oligomers, siloxane oligomers having a (meth)acryloyloxy group, and a reactive oligomer obtained by reacting (meth)acrylic acid and a copolymer of glycidyl methacrylate and other polymerizable monomers. Further examples of reactive oligomers include unsaturated polyester resins, which are usually prepared from maleic acid, phthalic acid and one or more diols and which have molecular weights of greater than about 500. Unsaturated oligomers of this type are also known as prepolymers. Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and copolymers thereof, polybutadiene and butadiene copolymers, polyisoprene and isoprene copolymers, polymers and copolymers containing (meth)acrylic groups in side-chains, as well as mixtures of one or more than one such polymer.

Illustrative examples of unsaturated carboxylic acids are acrylic acid, methacrylic acid, crotonic acid, itaconic acid, cinnamic acid, unsaturated fatty acids such as linolenic acid or oleic acid. Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin.

In an embodiment, the reactive oligomer component includes one or more bisphenol A-based (meth)acrylate oligomers such as alkoxylated bisphenol-A-di(meth)acrylate and diglycidyl-bisphenol-A-di(meth)acrylate. In another embodiment, the reactive oligomer component comprises, consists essentially of, or consists of polyether-based methacrylate oligomers, polycarbonate methacrylate oligomers, polyester methacrylate oligomers, alkyd methacrylate oligomers and methacrylated acrylic oligomers, and mixtures thereof.

In a preferred embodiment, the reactive oligomer component comprises, consists essentially of, or consists of one or more difunctional oligomers. As used herein, "difunctional" means possession of an average of between 1.5 to less than 2.5 polymerizable groups per molecule, as determined by an NMR method. In other embodiments, however, the reactive oligomer component comprises, consists essentially of, or consists of at least oligomer with a functionality of greater than 2.5, such as the case in situations wherein difunctional endcappers are placed at the terminus of an oligomer. In an embodiment, therefore, the reactive oligomer component comprises, consists essentially of, or consists of a trifunctional (i.e. from 2.5 to 3.4 polymerizable groups per molecule) or tetrafunctional (i.e. from 3.5 to 4.4 polymerizable groups per molecule) oligomer.

Furthermore, in a preferred embodiment, the reactive oligomer component comprises, consists essentially of, or consists of one or more reactive oligomers having an Mn of greater than 2000 g/mol. If the Mn of any (or all) of the reactive oligomers falls below this value, the final coating properties may be detrimentally affected, and/or the composition may tend to solidity at room temperature. In an embodiment, the reactive oligomer component possesses an Mn that is even higher, such as greater than 3000, or greater than 4000, or greater than 5000, or greater than 6000, or greater than 7000, or greater than 8000 g/mol.

In a preferred embodiment, the reactive oligomer component comprises, consists essentially of, or consists of difunctional urethane-containing reactive oligomers possessing an Mn of from 7000 g/mol to 25,000 g/mol. In a preferred embodiment, such oligomers are aliphatic polyether urethane methacrylate oligomers and aliphatic urethane methacrylate oligomers using blends of the abovementioned polyols. As used herein with respect to reactive oligomers, the term "aliphatic" refers to the fact that a wholly aliphatic diisocyanate is used.

One or more of the aforementioned reactive oligomers can be employed in compositions according to the present invention in any suitable amount and may be chosen singly or in combination of one or more of the types enumerated herein. In an embodiment, the reactive oligomer component is present in an amount, relative to the entire weight of the composition, of from about 5 wt. % to about 90 wt. %, or from about 10 wt. % to about 90 wt. %, or from about 10 wt. % to about 80 wt. %. In an embodiment, the reactive oligomer component is present in an amount from of at least 30 wt. %, or at least 40 wt. %, or at least 50 wt. %, or at least 55 wt. %, or at least 60 wt. %, or at least 65 wt. %, or at least 70 wt. %, or from 25-90 wt. %, or from 30-85 wt. %, or from 40-80 wt. %, or from 45-85 wt. %, or from 55 to 80 wt. %, or from 60 to 85 wt. %, or from 60 to 80 wt. %.

Reactive Diluent Monomers

Compositions according to the first aspect of the present invention also include a reactive diluent monomer component. As specified with respect to the qualification of the oligomer component described elsewhere herein, "reactive" means the ability to form a chemical reaction, preferably a polymerization reaction, with another molecule. As such, a reactive compound will be said to possess at least one reactive, or functional, group. It is preferred that such reactive or functional group is a polymerizable group. A monomer, meanwhile, is used herein to mean a molecule of low relative molecular mass, the structure of which can undergo polymerization thereby contributing constitutional units to the essential structure of a macromolecule. As used herein, a component is considered a monomer if it further possesses a number average molecular weight (Mn) that is less than about 1000 g/mol. In a preferred embodiment, however, the reactive diluent monomer component consists of one or more reactive diluent monomers having an Mn from about 86 g/mol (the molar mass of methyl acrylate) to 800 g/mol, or from 100 g/mol to 350 g/mol, or from or from 86 g/mol to 250 g/mol, as measured by an appropriate SEC method. In another embodiment, the reactive diluent monomer component consists of one or more reactive diluent monomers having a theoretical molecular weight from about 86 g/mol to 800 g/mol, or from 100 g/mol to 350 g/mol, or from 86 g/mol to 250 g/mol, wherein Mn, theo is determined by adding the standard atomic weights of all atoms in the ideal chemical structure associated with a particular compound. Mn, theo of a compound is therefore also commonly referred to as that compound's molar mass.

As used herein, a "diluent" means a substance which reduces the viscosity of the greater composition into which it is added or with which it is associated. A variety of diluents are used to maximize the flowability, and in turn the processability, of the optical fiber coating compositions with which they are associated.

In a preferred embodiment, the reactive diluent monomer component comprises a plurality of individual reactive diluent monomer molecules. In an embodiment, the reactive diluent monomer component consists of, or consists essentially of, a plurality of reactive diluent monomer molecules, wherein each molecule possesses the same, or substantially the same chemical structure. In an alternative embodiment, the reactive diluent monomer component consists of a plurality of reactive diluent monomer molecules having different chemical structures. In an embodiment, the reactive diluent monomer component consists of reactive diluent monomers of 2, or more than 2 different types.

The reactive diluent monomer component according to the invention comprises, consists essentially of, or consists of reactive diluent monomers having at least one polymerizable group. In a preferred embodiment, the reactive diluent monomer component consists of reactive diluent monomers having, on average, one polymerizable group. The polymerizable group(s) of the reactive diluent monomer are preferably able to (co)polymerize with the polymerizable groups present in the associated reactive oligomer component.

The polymerizable groups of the reactive diluent monomer component may be of any known type. In an embodiment, however, the polymerizable group may comprise, consist essentially of, or consist of acrylate, acrylamide, or N-vinyl amide groups, or any combination thereof. The reactive diluent monomers are preferably ethylenically unsaturated polymerizable compounds that contain at least one reactive olefinic double bond.

The polymerizable group(s) may occur at any feasible point along the length of the reactive diluent monomer. In a preferred embodiment, however the polymerizable groups comprise, consist essentially of, or consist of polymerizable endgroups.

Reactive diluent monomers according to the present invention may be of any known type consistent with the definitions specified elsewhere herein. In a preferred embodiment, however, the reactive diluent monomer comprises, consists essentially of, or consists of one or more reactive diluent monomers containing one double bond.

Typical examples of such reactive diluent monomers containing one double bond are alkyl or hydroxyalkyl acrylates, for example methyl, ethyl, butyl, 2-phenoxy ethyl, 2-ethylhexyl, and 2-hydroxyethyl acrylate, isobornyl acrylate, methyl and ethyl acrylate, lauryl-acrylate, ethoxylated nonyl-phenol acrylate, and diethylene-glycol-ethyl-hexyl acylate (DEGEHA). Further examples of these monomers are acrylonitrile, acrylamide, N-substituted acrylamides, vinyl esters such as vinyl acetate, styrene, alkylstyrenes, halostyrenes, N-vinylpyrrolidone, N-vinyl caprolactam, vinyl chloride and vinylidene chloride. Examples of monomers containing more than one double bond are ethylene glycol diacrylate, propylene glycol diacrylate, tripropylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, and vinyl acrylate.

The monomer used may be apolar or polar. Certain apolar monomers which may be suitably used include 2-ethylhexyl acrylate (EHA), tridecyl acrylate (TDA), isodecyl acrylate (IDA), lauryl acrylate (LA), isobornyl acrylate (IBOA), and various caprolactone acrylates, such as those known commercially as Tone™ M100 or Sartomer SR 495B.

More polar monomers which may be used include dimethylacryl-amide (dMAA), N-vinyl pyrrolidone (nVP), 2-(2-ethoxyethoxy)ethyl acrylate (EOEOA), 4-hydroxy butyl acrylate (4-HBA), 2-phenoxyethyl acrylate (PEA), ethoxylated nonyl phenol acrylate (ENPA), ethoxylated 2-phenoxy ethyl acrylate (EPEA), and propoxylated nonyl phenol acrylate (PONPA).

As discussed above, Inventors have presently and unexpectedly discovered that compositions incorporating reactive oligomers with methacrylate functionality, as described above, facilitate the creation of superior application-specific properties. It has been further presently observed, however, that such properties are achievable when such methacrylate-functional oligomers are paired with certain types of reactive diluent monomers. Specifically, Inventors have surprisingly discovered these superior results when methacrylate-functional oligomers are paired with reactive diluent monomers possessing at least some non-methacrylate functionality, such as diluent monomers possessing acrylate, acrylamide, or N-vinyl amide functionality.

Therefore, at least some of the polymerizable groups of the reactive diluent monomers in the reactive diluent monomer component comprise an acrylic or N-vinyl double bond. In a preferred embodiment, the polymerizable groups of the reactive diluent monomer comprise acrylate, acrylamide, or N-vinyl amide groups. In a preferred embodiment, at least 50%, or at least 60%, or at least 70%, or at least 80%, or at least 90%, or at least 99%, or around 100% of the polymerizable groups of the reactive diluent monomer component consist of one or more of acrylate, acrylamide, and/or N-vinyl amide groups. In a preferred embodiment, the N-vinyl amide groups comprise, consist essentially of, or consist of N-vinyl caprolactam groups.

In an alternative embodiment, the polymerizable groups present in the reactive diluent monomer component consist of, or consist essentially of, acrylate groups. In another embodiment, when counting only the total number of methacrylate and acrylate groups present in all of the reactive diluent monomers in the reactive diluent monomer component as polymerizable groups, the reactive diluent monomer component consists of, or consists essentially of, acrylate groups.

In a preferred embodiment, at least 50%, or at least 60%, or at least 70%, or at least 80%, or at least 90%, or at least 99%, or around 100% of the polymerizable groups of the reactive diluent monomer component consist of one or more of acrylate groups. In a preferred embodiment, the polymerizable groups or polymerizable endgroups of the reactive diluent monomer component consists or consist essentially of acrylate groups. Furthermore, it is preferable that the number of methacrylate groups in the reactive diluent monomer component be maintained as low as possible, preferably less than 20%, or less than 10%, or less than 5%, or less than 1%, or preferably around 0% of the total number of polymerizable groups in the reactive diluent monomer component.

With respect to the entire composition, however, in an embodiment, the ratio of acrylate groups to methacrylate groups present in the entire composition is greater than 4:1, or greater than 25:1, but preferably less than 50:1. Alternatively, the ratio of acrylate groups to methacrylate groups present in the entire composition is from 4:1 to 50:1, or from 4:1 to 25:1, or from 4:1 to 10:1, or from 4.6:1 to 50:1, or from 4.6:1 to 25:1, or from 4.6:1 to 10:1, or from 5.6:1 to 50:1, or from 5.6:1 to 25:1, or from 5.6:1 to 10:1.

In a preferred embodiment, the reactive diluent monomer component comprises, consists essentially of, or consists of one or more monofunctional diluent monomers. As used herein, "monofunctional" means possession of an average of between 0.5 to 1.4 polymerizable groups per molecule, as determined by nuclear magnetic resonance spectroscopy (NMR) methods.

One or more of the aforementioned reactive diluent monomers can be employed in compositions according to the present invention in any suitable amount in order to tune the viscosity of the formulation with which they are associated to be suitable for the optical fiber coating process to be used therewith according to methods well-known in the art to which this invention applies. and may be chosen singly or in combination of one or more of the types enumerated herein. In an embodiment, the reactive diluent monomer component is present in an amount, relative to the entire weight of the radiation curable composition, from 1 wt. % to 50 wt. %, or from 1 wt. % to 30 wt. %, or from 5 wt. % to 70 wt. %, or from 5 wt. % to 50 wt. %, or from 10 wt. % to 70 wt. %, or from 10 wt. % to 60 wt. %., or from 10 wt. % to 50 wt. %, or from 20 wt. % to 50 wt. %.

Photoinitiator Component

In preferred embodiments, the liquid radiation curable resin for coating an optical fiber of the present invention includes a photoinitiator component. The photoinitiator is a compound that chemically changes due to the action of light or the synergy between the action of light and the electronic excitation of a sensitizing dye to produce at least one of a radical, an acid, and a base. Well-known types of photoinitiators include cationic photoinitiators and free-radical photoinitiators. According to an embodiment of the present invention, the photoinitiator is a free-radical photoinitiator.

In an embodiment, the photoinitiator component includes an acylphosphine oxide photoinitiator. Acylphosphine oxide photoinitiators are disclosed for example in U.S. Pat. Nos. 4,324,744, 4,737,593, 5,942,290, 5,534,559, 6,020,529, 6,486,228, and 6,486,226.

The acylphosphine oxide photoinitiators are bisacylphosphine oxides (BAPO) or monoacylphosphine oxides (MAPO).

The bisacylphosphine oxide photoinitiators are of the formula I:

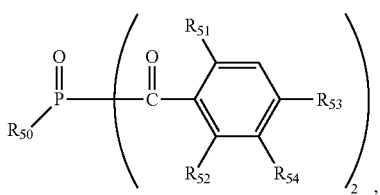

(I)

wherein $R_{50}$ is $C_1$-$C_{12}$ alkyl, cyclohexyl or phenyl which is unsubstituted or is substituted by 1 to 4 halogen or $C_1$-$C_8$ alkyl;

$R_{51}$ and $R_{52}$ are each independently of the other $C_1$-$C_8$ alkyl or $C_1$-$C_8$ alkoxy;

$R_{53}$ is hydrogen or $C_1$-$C_8$ alkyl; and $R_{54}$ is hydrogen or methyl.

For example, $R_{50}$ is $C_2$-$C_{10}$ alkyl, cyclohexyl or phenyl which is unsubstituted or is substituted by 1 to 4 $C_1$-$C_4$ alkyl, Cl or Br. Another embodiment is where $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. For instance, $R_{50}$ is $C_4$-$C_{12}$ alkyl or cyclohexyl, $R_{51}$ and $R_{52}$ are each independently of the other $C_1$-$C_8$ alkyl or $C_1$-$C_8$ alkoxy and $R_{53}$ is hydrogen or $C_1$-$C_8$ alkyl. For instance, $R_{51}$ and $R_{52}$ are $C_1$-$C_4$ alkyl or $C_1$-$C_4$ alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl. For example, $R_{51}$, $R_{52}$ and $R_{53}$ are methyl. Another embodiment is where $R_{51}$, $R_{52}$ and $R_{53}$ are methyl and $R_{54}$ is hydrogen. Another embodiment is where $R_{50}$ is $C_3$-$C_8$ alkyl. For example, $R_{51}$ and $R_{52}$ are methoxy, $R_{53}$ and $R_{54}$ are hydrogen and $R_{50}$ is isooctyl. For instance, $R_{50}$ is isobutyl. For example, $R_{50}$ is phenyl. The present bisacylphosphine oxide photoinitiator is for example bis(2,4,6-trimethylbenzoyl)-phenyl phosphine oxide (CAS #162881-26-7) or is bis(2,4,6-trimethylbenzoyl)-(2,4-bis-pentyloxyphenyl)phosphine oxide.

The monoacylphosphine oxide photoinitiators are of the formula II:

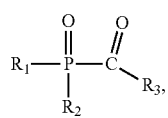

(II)

in which $R_1$ and $R_2$ independently of one another are $C_1$-$C_{12}$ alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$;

$R_3$ is phenyl which is unsubstituted or substituted from one to four times by $C_1$-$C_8$ alkyl, $C_1$-$C_8$ alkoxy, $C_1$-$C_8$ alkylthio and/or halogen; and $R_4$ is $C_1$-$C_8$ alkyl, phenyl or benzyl. For example, $R_1$ is —$OR_4$. For example, $R_2$ is phenyl which is unsubstituted or substituted from one to four times by halogen, $C_1$-$C_8$ alkyl and/or $C_1$-$C_8$ alkoxy. For example, $R_3$ is phenyl which is unsubstituted or substituted from one to four times by $C_1$-$C_8$ alkyl. For example, the present monoacylphosphine oxide is 2,4,6-trimethylbenzoylethoxyphenylphosphine oxide (CAS #84434-11-7) or 2,4,6-trimethylbenzoyldiphenylphosphine oxide (CAS #127090-72-6).

Compositions according to the present invention may also employ further photoinitiators, for example α-hydroxy ketone photoinitiators of the formula III:

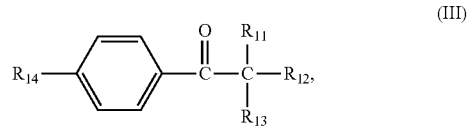

(III)

where $R_{11}$ and $R_{12}$ independently of one another are hydrogen, $C_1$-$C_6$ alkyl, phenyl, $C_1$-$C_6$ alkoxy, $OSiR_{16}(R_{17})_2$ or —$O(CH_2CH_2O)_q$—$C_1$-$C_6$ alkyl, or $R_{11}$ and $R_{12}$, together with the carbon atom to which they are attached, form a cyclohexyl ring;

q is a number from 1 to 20;

$R_{13}$ is OH, $C_1$-$C_{16}$ alkoxy or —$O(CH_2CH_2O)_q$—$C_1$-$C_6$ alkyl;

$R_{14}$ is hydrogen, $C_1$-$C_{18}$ alkyl, $C_1$-$C_{12}$ hydroxyalkyl, $C_1$-$C_{18}$ alkoxy, —$OCH_2CH_2$—$OR_{15}$, —$CH$=$CH_2$, —$C(CH_3)$=$CH_2$ or is

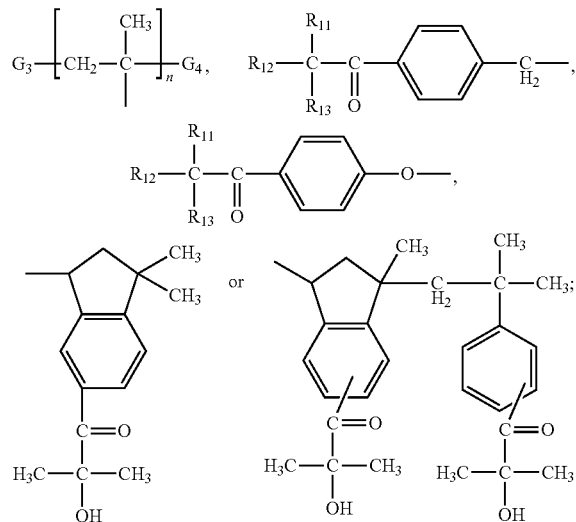

n is a number from 2 to 10;

$R_{15}$ is hydrogen, —$COCH$=$CH_2$ or —$COC(CH_3)$=$CH_2$;

$R_{16}$ and $R_{17}$ independently of one another are $C_1$-$C_8$ alkyl or phenyl; and $G_3$ and $G_4$ independently of one another are end groups of the polymeric structure, preferably hydrogen or methyl.

α-hydroxy ketone photoinitiators that are of interest are those in which $R_{11}$ and $R_{12}$ independently of one another are hydrogen, $C_1$-$C_6$ alkyl or phenyl or $R_{11}$ and $R_{12}$; together with the carbon atom to which they are attached, form a cyclohexyl ring, $R_{13}$ is OH, and $R_{14}$ is hydrogen, $C_1$-$C_{12}$ alkyl, $C_1$-$C_{12}$ alkoxy, —OCH$_2$CH$_2$OR$_{15}$, —C(CH$_3$)=CH$_2$ or is

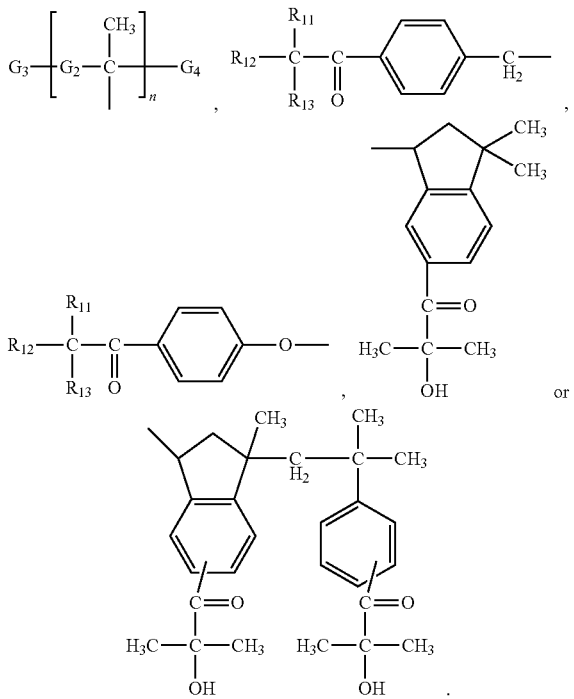

For example, suitable as the α-hydroxy ketone photoinitiators are those in which $R_{11}$ and $R_{12}$ independently of one another are methyl or ethyl or $R_{11}$ and $R_{12}$; together with the carbon atom to which they are attached, form a cyclohexyl ring, $R_{13}$ is hydrogen and $R_{14}$ is hydrogen, $C_1$-$C_4$ alkyl, $C_1$-$C_4$ alkoxy or —OCH$_2$CH$_2$OH. Interesting also are compounds, wherein $R_{14}$ is

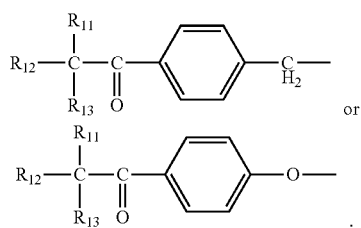

For instance, suitable α-hydroxy ketone photoinitiators are
α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone,
2-Hydroxy-1-{4-[4-(2-hydroxy-2-methyl-propionyl)-benzyl]-phenyl}-2-methyl-propan-1-one and
2-hydroxy-2-methyl-1-[(2-hydroxyethoxy)phenyl]propanone.

The present α-hydroxy ketone photoinitiator is for example α-hydroxycyclohexylphenyl ketone or 2-hydroxy-2-methyl-1-phenyl-1-propanone. Straight or branched chain alkyl is for example, methyl, ethyl, propyl, isopropyl, butyl, isobutyl, sec-butyl, tert-butyl, pentyl, isopentyl, isooctyl, hexyl, heptyl, octyl, nonyl, decyl or dodecyl. Likewise, alkoxy or alkylthio are of the same straight or branched chains.

Photoinitiators according to the present invention may be employed singularly or in combination of one or more as a blend. Suitable photoinitiator blends are for example disclosed in U.S. Pat. No. 6,020,528 and U.S. Pat. app. No. 60/498,848. According to an embodiment, the photoinitiator component includes a photoinitiator blend of, for example, bis(2,4,6-trimethylbenzoyl)phenyl phosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable photoinitiator blend is a mixture of bis(2,4,6-trimethylbenzoyl)phenyl phosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable photoinitiator blend is a mixture of bis(2,4,6-trimethylbenzoyl)phenyl phosphine oxide and 2-hydroxy-2-methyl-1-phenyl-1-propanone in weight ratios of for instance about 1:3, 1:4 or 1:5. In an embodiment, the present acylphosphine oxide or photoinitiator blend is present in the radiation-curable compositions from about 0.2 to about 10% by weight, based on the weight of the composition. For instance, the photoinitiator blend may be present from about 0.5 to about 8%, about 1 to about 7%, or about 2, 3, 4, 5 or 6% by weight based on the weight of the radiation-curable composition.

Other suitable photoinitiators according to this invention are for or example, other mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl)-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Other suitable photoinitiators employed according to this invention, with or without acylphosphine oxide photoinitiators, are for example oxime esters as disclosed in U.S. Pat. No. 6,596,445. A suitable oxime ester photoinitiator is for example:

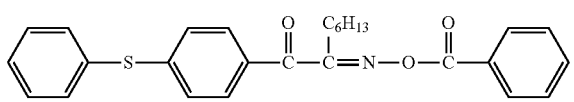

Another class of suitable photoinitiators according to this invention, with or without acylphosphine oxide photoinitiators, are for example phenyl glyoxalates, for example as disclosed in U.S. Pat. No. 6,048,660. For example, phenyl glyoxalates of the formula:

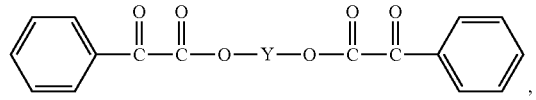

wherein Y is $C_1$-$C_{12}$alkylene, cyclohexylene, $C_2$-$C_{40}$alkylene interrupted one or more times by cyclohexylene, O, S, or $NR_{30}$, and $R_{30}$ is hydrogen, $C_1$-$C_{12}$alkyl or phenyl, preferably Y is $CH_2CH_2$—O—$CH_2CH_2$.

According to another embodiment, the composition may contain a photoinitiator that is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of silicon, germanium, tin, and lead. In an embodiment, the alkyl-, aryl-, or acyl-substituted photoinitiator is an acylgermanium compound. Such photoinitiators are described in, U.S. Pat. No. 9,708,442, assigned to DSM IP Assets B.V., which is hereby incorporated by reference in its entirety In an embodiment, the composition includes a photoinitiator that is a germanium-based compound possessing a structure in accordance with the following formula:

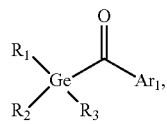

in which $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups. Polymerizable compositions with acylgermanium compounds are described in, i.a, U.S. Pat. No. 7,605,190, assigned to Ivoclar Vivadent AG.

In an embodiment, each of $R_1$-$R_3$ is an aryl-substituted or aromatic acyl group. In an embodiment, exactly two of $R_1$-$R_3$ are an aryl-substituted or aromatic acyl group, with the remaining substituted groups being a $C_1$-$C_{10}$, or a $C_1$-$C_6$, or a $C_1$-$C_3$ alkyl. In an embodiment, exactly one of $R_1$-$R_3$ is an aryl-substituted or aromatic acyl group, with the remaining two substituted groups being a $C_1$-$C_{10}$, or a $C_1$-$C_6$, or a $C_1$-$C_3$ alkyl. In another embodiment, each of $R_1$-$R_3$ is a $C_1$-$C_{10}$, or a $C_1$-$C_6$, or a $C_1$-$C_3$ alkyl.

In an embodiment, the acylgermanium photoinitiator is a compound possessing one of the following molecular structures:

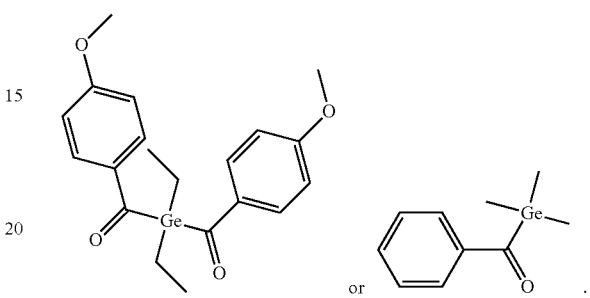

In an embodiment, the free-radical photoinitiator is an acylgermanium compound. In an embodiment, the acylgermanium is a benzoyl trimethyl germane (BTG), tetracylgermanium, or bis acyl germanoyl (commercially available as Ivocerin® from Ivoclar Vivadent AG, 9494 Schaan/Liechtenstein).

One or more of the aforementioned photoinitiators can be employed in compositions according to the present invention in any suitable amount and may be chosen singly or in combination of one or more of the types enumerated herein. In a preferred embodiment, the photoinitiator component comprises, consists of, or consists essentially of free-radical photoinitiators. In an embodiment, the photoinitiator component is present in an amount, relative to the entire weight of the composition, of from about 0.1 wt. % to about 10 wt. %, or from about 0.1 wt. % to about 5 wt. %, or from about 1 wt. % to about 5 wt. %.

Additives

Additives are also typically added to optical fiber coatings to achieve certain desirable characteristics such as improved shelf life, improved coating oxidative and hydrolytic stability, and the like. There are many different types of desirable additives, and the invention discussed herein is not intended to be limited by these, nevertheless they are included in the envisioned embodiments since they have desirable effects.

Examples of these are thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, paraffin or similar wax-like substances can be added; these migrate to the surface on commencement of the polymerization because of their low solubility in the polymer and form a transparent surface layer which prevents the ingress of air. It is likewise possible to apply an oxygen barrier layer.

Light stabilizers which can be added are UV absorbers, for example well known commercial UV absorbers of the hydroxyphenylbenzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines are for example:

2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(w-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

To accelerate the photopolymerization it is possible to add other additives such as accelerators, coinitiators and autoxidizers such as thiols, thioethers, disulfides and phosphines, as are described, for example, in EP-A-438 123 and GB-A-2 180 358.

The photopolymerization can also be accelerated by the addition of photosensitizers, which shift or broaden the spectral sensitivity. These are, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes. Alternatively, non-aromatic carbonyl compounds may be used. An example of a non-aromatic carbonyl is dimethoxy anthracene.

The curing procedure can be assisted, in particular, by compositions which are pigmented (for example with titanium dioxide), and also by adding a component which forms free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817. Further suitable for this purpose include benzopinacol compounds.

The novel compositions can also include a photo reducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253.

Other conventional additives may be used depending on the intended application. Examples include fluorescent whiteners, fillers, pigments, dyes, wetting agents or levelling assistants. Thick and pigmented coatings can also contain glass microbeads or powdered glass fibers, as described in U.S. Pat. No. 5,013,768, for example.

If the composition is to be used as a primary coating, it is preferred that fillers are not included therein. Particulate fillers, particularly those including fine particles or fibers, can damage the glass optical fiber with which such coating is associated. Therefore, in an embodiment, the composition is substantially free of particulate filler or nanoparticles, or contains less than 5 wt. %, or less than 3 wt. %, or less than 1 wt. % of particulate filler or nanoparticles.

In a preferred embodiment, the additive component includes one or more adhesion promoter compounds. Such adhesion promoters provide a link between the polymer primary coating and the surface of the optical glass fiber. Silane coupling agents, which are hydrolysable, have been used as glass adhesion promoters. Silane coupling agents have the general structure $(RO)_3$—Si—R'—X, where X is an organofunctional group, R' is an alkylene linkage, and RO is a hydrolysable group (such as an alkoxy group). Such agents are described in, i.a, U.S. Pat. No. 4,932,750. In an embodiment, the adhesion promoter is a hydrolysable silane compound which contains a mercapto group and/or a plurality of alkoxy groups. Such adhesion promoters are known and are described in, U.S. Pat. App. No. 20020013383, the relevant portions of which are hereby incorporated by reference.

In an embodiment, the adhesion promoter includes one or more of gamma-mercaptopropyltrimethoxysilane, trimethoxysiliylpropyl acrylate, tetraethoxysilane, or 3-trimetoxysilylpropane-1-thiol. Silane coupling groups may alternatively be reacted onto oligomers in the oligomer component; in such case they will be considered not as an additive but as part of the oligomer component.

One or more of the aforementioned additives can be employed in compositions according to the present invention in any suitable amount and may be chosen singly or in combination of one or more of the types enumerated herein. In a preferred embodiment, the additive component is present in an amount, relative to the entire weight of the composition, of from about 0.01 wt. % to about 5 wt. %, more preferably from about 0.1 wt. % to about 2 wt. %. According to another embodiment, the one or more of the aforementioned additives are included in an amount from about 1 wt. % to about 5 wt. %.

A second aspect of the current invention is a method for coating an optical fiber, comprising providing a glass optical fiber; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition is a composition according to any of the embodiments of the first aspect of the current invention.

Preferably, the glass optical fiber is provided by drawing said optical fiber through a draw tower in processes well-understood according to those having ordinary skill in the field of creating fiber optic coatings.

Another embodiment of the second aspect describes optical fiber coating processes according to one or more of the following conditions: at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min; or under the application of no helium, or the application of helium at a flow rate of less than 20 standard liters per minute (SLM), or less than 10 SLM, or less than 5 SLM, or from 1 to 20 SLM, or from 1 to 10 SLM, or from 1 to 5 SLM, or from 5 to 20 SLM, or from 5 to 10 SLM.

A third aspect of the current invention is a coated optical fiber, the coated optical fiber comprising a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to this third aspect, the primary coating layer is a cured product of a radiation curable composition according to any of the embodiments of the first aspect.

Figure 9:
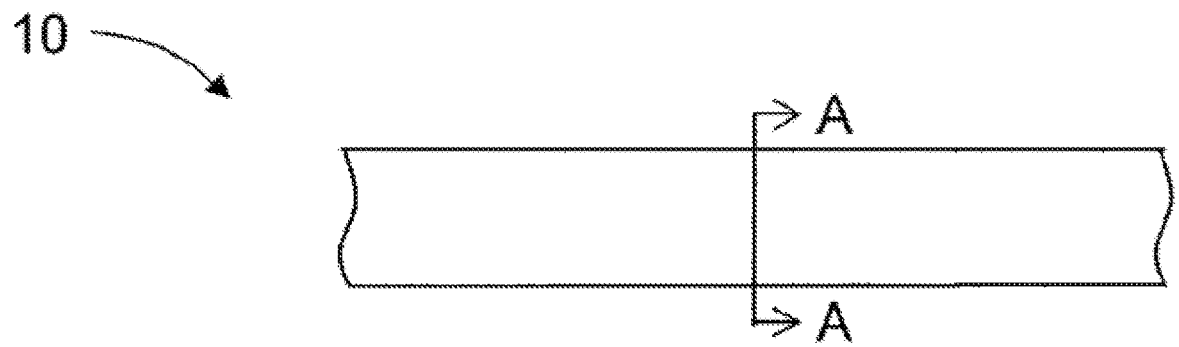
FIG. 9 schematically depicts a cross section of an optical fiber according to embodiments described herein.
Figure 10:
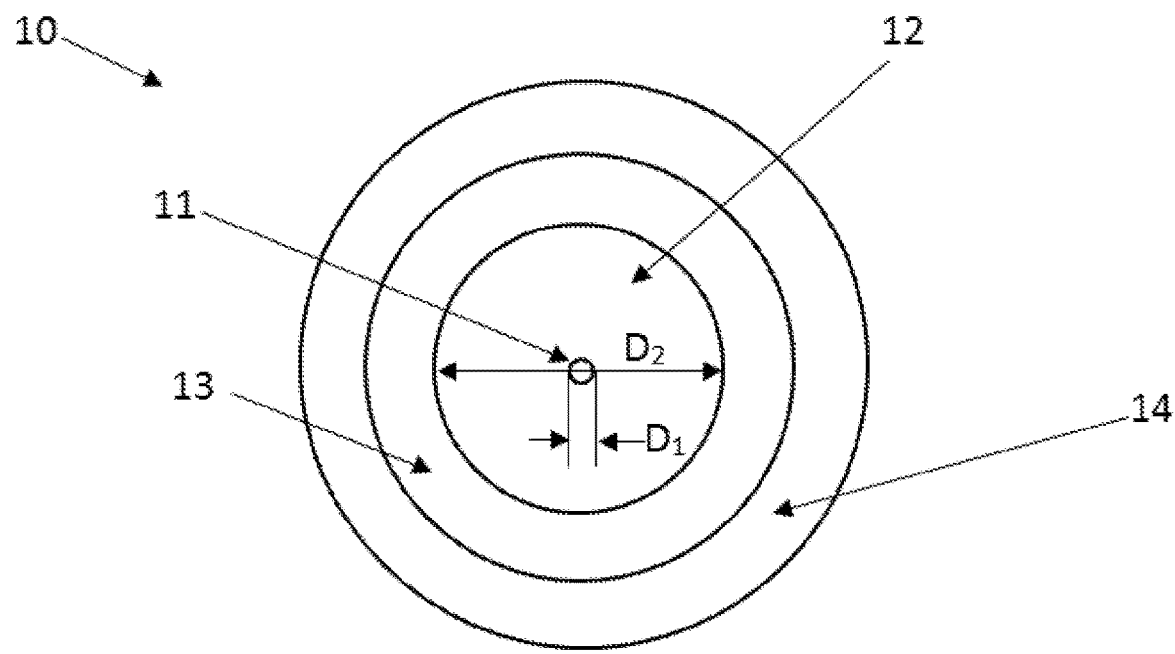
FIG. 10 is a cross-sectional view taken along the line A-A and illustrates a configuration for one example embodiment of the optical fiber of FIG. 9.

A coated optical fiber according to embodiments of the third aspect is depicted in FIG. 9 and FIG. 10. In FIG. 9, a side view of fiber 10 as discussed herein is depicted. FIG. 10, meanwhile, is a cross-sectional view of fiber 10 an example of the result of the coated fiber described herein.

The optical fiber 10 comprises a core 11, a cladding 12, a primary coating 13 contacting and surrounding the outer annular cladding region, and a secondary coating 14. The outer diameter of the core 11 is $D_1$ and the outer diameter of the cladding 12 is $D_2$. The primary coating 13 is a typical primary coating that has an in situ (or on-fiber) tensile modulus of less than 1.5 MPa, or less than 1.2 MPa, or as low as 0.35 MPa, 0.3 MPa, or 0.25 MPa, and in other embodiments not more than 0.2 MPa. Methods for describing in-situ modulus are well-known in the art and are described in, inter alia, U.S. Pat. Nos. 7,171,103 and 6,961,508, each of which is assigned to DSM IP Assets B.V. The cured primary coating 13 has an in-situ glass transition temperature less than −35° C., or less than −40° C., or less than −45° C., and in other embodiments not more than −50° C. A primary coating with a low in situ modulus reduces the microbending which is the coupling mechanism between the modes propagating in the fiber. A low in situ glass transition temperature ensures that the in-situ modulus of the primary coating will remain low even when the fiber is deployed in very cold environments. The microbending performance will therefore be stable with temperature, resulting in low mode coupling in all situations. The secondary coating 14 is in contact with and surrounds the primary coating 13. The secondary coating 14 has an in situ tensile modulus of greater than 800 MPa, or greater than 1110 MPa, or greater than 1300 MPa, or greater than 1400 MPa, or greater than 1500 MPa. A secondary coating with a high in situ modulus reduces the microbending which is the coupling mechanism between the modes propagating in the fiber.

In the embodiments shown and described herein, core 11 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof. The cladding 12 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [$\Delta_{1\ MAX}$] of the core 11 is greater than the maximum relative refractive index [$\Delta_{4\ MAX}$] of the cladding 12. According to one embodiment, cladding 12 is pure silica glass.

Any optical fiber type may be used in embodiments of the third aspect of present invention. In a preferred embodiment, however, the coated optical fiber possesses a mode-field diameter from 8 to 10 μm at a wavelength of 1310 nm, or a mode-field diameter from 9 to 13 μm at a wavelength of 1550 nm, and/or an effective area between 20 and 200 μm². Such fibers may be single mode and/or large-effective area fibers, given the expected demand for coating processes for these fibers that utilize higher line or processing speeds. However, other fiber types, such as multimode fibers, may be used as well.

The primary coating 13 preferably has a higher refractive index than the cladding 12 of the optical fiber 10, in order to allow it to strip errant optical signals away from the core of optical fiber. For example, an exemplary transmission optical fiber 10 may have refractive index values at a wavelength of 1550 nm for the core and cladding of 1.447 and 1.436, respectively; as such, it is desirable that the refractive index of primary coating 13 be greater than 1.44 at 1550 nm. The primary coating 13 maintains adequate adhesion to the glass fiber during thermal and hydrolytic aging, yet (if needed) is capable of being strippable therefrom for splicing purposes. The primary coating 13 typically has a thickness in the range of 20-50 µm (e.g., about 25 or 32.5 µm), thinner thickness in the range of 15-25 µm for 200 µm fibers.

Coating 13 is a primary coating, which normally is applied directly to the glass fiber. Coating 13 is preferably formed from a soft crosslinked polymer material having a low in situ modulus and a low in situ $T_g$.

The primary coating 13 preferably has a thickness that is less than about 40 µm, more preferably between about 20 to about 40 µm, most preferably between about 20 to about 30 µm. Primary coating 13 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

As noted, the primary coating composition may be selected from any of the embodiments of the first aspect of the current invention described elsewhere herein. In an embodiment, suitable primary coating compositions may include, without limitation, about 10 to 95 weight percent, or from 10 to 90 weight percent, or from about 25 to about 75 weight percent of one or more urethane acrylate oligomers; about 10 to about 65 weight percent, more preferably from about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; optionally about 0.5 to about 1.5 pph of one or more adhesion promoters; optionally about 0.1 to about 10 pph PAG compound; and about 0.01 to about 0.5 pph of one or more stabilizers.

Coating 14 is the outer coating, and it serves the traditional purpose of a "secondary coating". The outer coating material 14 is, for example, the polymerization product of a coating composition whose molecules become highly crosslinked when polymerized. In the embodiments described herein coating 14 has a high in situ modulus (e.g., greater than about 800 MPa at 25° C.) and a high $T_g$ (e.g., greater than about 50° C.). The in situ secondary modulus is preferably greater than about 1000 MPa, more preferably greater than about 1100 MPa and most preferably greater than about 1200 MPa. According to some preferred embodiments, the in situ secondary modulus is greater than 1200 MPa. In other preferred embodiments, the in situ secondary modulus is between about 1000 MPa and about 8000 MPa, more preferably between about 1200 MPa and about 5000 MPa, and most preferably between about 1500 MPa and about 3000 MPa. The in situ $T_g$ of the secondary coating is preferably between about 50° C. and about 120° C., more preferably between about 50° C. and about 100° C. In an embodiment, the secondary coating 14 has a thickness that is less than about 40 µm, more preferably between about 20 to about 40 µm, most preferably between about 20 to about 30 µm.

Other suitable materials for use in outer (or secondary) coating materials, as well as considerations related to selection of these materials, are well known in the art and are described in, for example, U.S. Pat. Nos. 4,962,992 and 5,104,433 to Chapin. As an alternative to these, high modulus coatings have also been obtained using low oligomer content coating systems, as described in U.S. Pat. No. 6,775,451 to Botelho et al., and U.S. Pat. No. 6,689,463 to Chou et al. In addition, non-reactive oligomer components have been used to achieve high modulus coatings, as described in U.S. Application Publ. No. 20070100039 to Schissel et al. Outer coatings are typically applied to the previously coated fiber (either with or without prior curing) and subsequently cured, as will be described in more detail herein below. Various additives that enhance one or more properties of the coating can also be present, including antioxidants, PAG compounds, photosensitizers, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable compositions for the secondary or outer coating 14 include, without limitation, about 0 to 70 weight percent of one or more urethane acrylate oligomers; about 20 to about 95 weight percent of one or more multifunctional ethylenically unsaturated monomers; about 0 to about 10 weight percent of one or more monofunctional ethylenically unsaturated monomers; about 1 to about 5 weight percent of one or more photoinitiators; about 0 to about 5 pph of one or more slip additives; and about 0.5 to about 1.5 pph of one or more antioxidants.

It is known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, © Elsevier Inc. 2007, published by Elsevier.

A fourth aspect of the invention is an optical fiber cable, wherein the optical fiber comprises at least one optical fiber according to the third aspects of the invention, and/or wherein the optical fiber is the cured product of a composition according to the first aspect of the invention, and/or wherein the optical fiber was coated according to the second aspect of the invention.

Improved compositions (and the coated optical fibers produced therefrom) of the current invention can be formulated via the selection of components specified above herein, and further readily tuned by those of ordinary skill in the art to which this invention applies by following the formulation guidelines herein, as well as by extrapolating from the general approaches taken in the embodiments illustrated in the examples below. The following such examples further illustrate the invention but, of course, should not be construed as in any way limiting its scope.

Examples

These examples illustrate embodiments of the instant invention. Table 1 describes the various components of the compositions used in the present examples. Table 2A describes the relative amounts of the reagents described in Table 1 which was used to synthesize the oligomers used in the present examples. Tables 2B and 2C represent further evaluation of select reactive diluent monomers and reactive oligomers, respectively. Finally, Tables 2D, 2E, and 2F represent illustrations of various calculations meant to characterize different examples referred to herein.

TABLE 1

Formulation Components
Mn, theo expressed in g/mol unless otherwise specified

| Component | Chemical Descriptor | Supplier/Manufacturer |
|---|---|---|
| PPG2000 | Bifunctional polypropylene glycol; Mn, theo approximately 2000 | Wanhua |
| EXENOL 3020 (PPG3000) | Bifunctional polypropylene glycol; Mn, theo approximately 3000 | Ashai glass Co. Ltd |
| PPG4000 | Bifunctional polypropylene glycol; Mn, theo approximately 4000 | Wanhua |
| Acclaim 8200 (PPG8000) | Bifunctional polypropylene glycol; Mn, theo approximately 8000 | Covestro |
| Nisso GI3000 (HPB3000) | Diol based on hydrogenated polybutadiene; Mn, theo approximately 3000 | Nippon Soda Co. Ltd |
| pTHF2000 | Diol based on THF; Mn, theo approximately 2000 | Mitsubishi |
| TDI | Toluenediisocyanate; CAS 584-84-9; Mn, theo 174.16 | Covestro, BASF |
| IPDI | Isophorone diisocyanate; CAS 4098-71-9; Mn, theo 222.3 | Evonik |
| TMDI | 2,2,4- and 2,4,4,-trimethyl-hexamethylene diisocyanate (about 1:1); CAS 28679-16-5; Mn, theo 210.27 | Evonik |
| HEA | 2-hydroxyethyl acrylate; CAS 818-61-1; Mn, theo 116.12 | Nippon Shokubai |
| HEMA | 2-hydroxyethyl methacrylate; CAS 868-77-9; Mn, theo 130.14 | Nippon Shokubai |
| AMG | Glycerol acrylate methacrylate; CAS 433937-38-3; Mn, theo 214.08 | TCI |
| DMG | Glycerol Dimethacrylate; CAS 1830-78-0; Mn, theo 228.24 | TCI |
| GMM | Glycerol monomethacrylate; CAS 5919-74-4; Mn, theo 160.17 | ABCR |
| eTMPDA | Ethoxylated (EO9) trimethylolpropane diacrylate; CAS 28961-43-5; Mn, theo 638 | DSM |
| EH | 2-ethyl hexanol; CAS 104-76-7; Mn, theo 130.23 | Sigma-Aldrich |
| BHT | Butylated hydroxytoluene (food grade); CAS 000128-37-0; | Lanxess, BASF |
| DBTDL | Dibutyltin dilaurate; CAS 77-58-7 | Evonik |
| EHA | 2-ethylhexyl acrylate; CAS 103-11-7; Mn, theo 184.28 | Sigma-Aldrich |
| TGDA | Triethylene glycol diacrylate; CAS 1680-21-3; Mn, theo 258.27 | abcr GmbH |
| TGDMA | Triethylene glycol dimethacrylate; CAS 109-16-0; Mn, theo 286.32 | abcr GmbH |
| EHMA | 2-ethylhexyl methacrylate; CAS 688-84-6; Mn, theo 198.30 | Sigma-Aldrich |
| PEA | 2-phenoxy ethyl acrylate; CAS 48145-04-6; Mn, theo 192.21 | Kowa American Corp., DSM |
| PEMA | 2-phenoxy ethyl methacrylate; CAS 10595-06-9; Mn, theo 206.24 | Sigma-Aldrich |
| NVC | N-vinyl caprolactam; CAS 2235-00-9; Mn, theo 139.19 | BASF, Alfa Aesar |
| IBOA | Isobornyl acrylate; CAS 5888-33-5; Mn, theo 208.30 | Sigma Aldrich |
| ACMO | 4-Acryloyl morpholine; CAS 5117-12-4; Mn, theo 141.17 | Sigma Aldrich |
| TPO | 2,4,6-trimethylbenzoyl diphenyl phosphine oxide; CAS 75980-60-8 | BASF |

TABLE 2A

Oligomer Reactants, in parts by weight

| Oligomer | Name | Polyol | Amt. | Isocyanate | Amt. | Endcap | Amt. | Other | Amt. | Amt. DBTDL | Amt. BHT |
|---|---|---|---|---|---|---|---|---|---|---|---|
| 1 | PPG2di HEA | PPG2000 | 84.06 | TDI | 10.97 | HEA | 4.88 | | | 0.05 | 0.05 |
| 2 | PPG3di HEA | PPG3000 | 89.307 | TDI | 7.403 | HEA | 3.29 | | | 0.027 | 0.024 |
| 3 | PPG4di HEA | PPG4000 | 91.3 | TDI | 5.96 | HEA | 2.65 | | | 0.05 | 0.05 |
| 4 | PPG8mono HEA | PPG8000 | 92.99 | TDI | 4.10 | HEA | 2.73 | | | 0.03 | 0.15 |
| 5 | PPG8di HEA | PPG8000 | 95.35 | TDI | 3.13 | HEA | 1.39 | | | 0.04 | 0.09 |
| 6 | PPG2di HEMA | PPG2000 | 83.56 | TDI | 10.91 | HEMA | 5.43 | | | 0.05 | 0.05 |
| 7 | PPG2tri HEMA | PPG2000 | 86.17 | TDI | 10.00 | HEMA | 3.74 | | | 0.05 | 0.05 |
| 8 | PPG3di HEMA | PPG3000 | 88.954 | TDI | 7.373 | HEMA | 3.673 | | | 0.027 | 0.024 |
| 9 | PPG4di HEMA | PPG4000 | 91.00 | TDI | 5.94 | HEMA | 2.96 | | | 0.05 | 0.05 |
| 10 | PPG8mono HEMA | PPG8000 | 92.68 | TDI | 4.09 | HEMA | 3.05 | | | 0.03 | 0.15 |
| 11 | PPG8di HEMA | PPG8000 | 95.18 | TDI | 3.15 | HEMA | 1.57 | | | 0.05 | 0.05 |
| 12 | HPB3di HEMA | HPB3000 | 91.34 | TDI | 5.92 | HEMA | 2.62 | | | 0.03 | 0.08 |
| 13 | PTHF2tri HEMA | PTHF2000 | 86.17 | TDI | 10.00 | HEMA | 3.74 | | | 0.05 | 0.05 |
| 14 | PPG4di TMDI HEMA | PPG4000 | 89.86 | TMDI | 7.08 | HEMA | 2.92 | | | 0.05 | 0.10 |
| 15 | PPG8mono IPDI HEMA | PPG8000 | 91.74 | IPDI | 5.13 | HEMA | 3.00 | | | 0.04 | 0.10 |
| 16 | PPG4di AMG | PPG4000 | 88.87 | TDI | 5.80 | AMG | 5.18 | | | 0.05 | 0.10 |
| 17 | PPG4di DMG | PPG4000 | 89.01 | TDI | 5.81 | DMG | 5.08 | | | 0.05 | 0.05 |
| 18 | PPG4di eTNIPDA | PPG4000 | 82.57 | TDI | 5.39 | eTMPDA | 11.94 | | | 0.05 | 0.05 |
| 19 | PPG3di HEA/EH | PPG3000 | 89.218 | TDI | 7.395 | HEA | 2.466 | EH | 0.921 | 0.027 | 0.024 |
| 20 | PPG3di HEMA/EH | PPG3000 | 88.953 | TDI | 7.373 | HEMA | 2.755 | EH | 0.919 | 0.027 | 0.024 |
| 21 | PPG3di AMG/EH | PPG3000 | 87.405 | TDI | 7.245 | AMG | 4.442 | EH | 0.908 | 0.027 | 0.024 |
| 22 | PPG8di GMM HEMA | PPG8000 | 93.33 | TDI | 4.15 | HEMA | 1.53 | GMM | 0.94 | 0.006 + 0.02 | 0.03 |
| 23 | PPG8di GMM HEA | PPG8000 | 93.33 | TDI | 4.15 | HEA | 1.30 | GMM | 0.94 | 0.006 + 0.02 | 0.03 |
| 24 | PPG8di GMM eTNIPDA | PPG8000 | 87.79 | TDI | 3.93 | eTMPDA | 7.35 | GMM | 0.88 | 0.006 + 0.02 | 0.03 |
| 25 | PPG8di GMM AMG | PPG8000 | 92.30 | TDI | 4.10 | AMG | 2.63 | GMM | 0.93 | 0.006 + 0.02 | 0.03 |
| 26 | PPG8di GMM DMG | PPG8000 | 92.05 | TDI | 4.15 | DMG | 2.81 | GMM | 0.93 | 0.006 + 0.02 | 0.03 |

Synthesis of Oligomers 1-18

First, the specified amount of the applicable polyol from Table 2A (e.g., 84.06 parts of PPG2000 for oligomer 1) was charged into a 250 ml reactor (equipped with a stirrer, air inlet, dropping funnel, and condenser). After charging, the reactor was heated to 45° C. before the reactor was purged with dry lean air. Then the specified amount of the applicable isocyanate (e.g., 10.97 parts of TDI for oligomer 1) was charged into the reactor whilst stirring. After this step the corresponding quantity of DBTDL (e.g., 0.05 parts for oligomer 1) was added into the reactor. After waiting one (1) hour for the reaction to commence, the temperature was then raised to 60° C. The 60° C. temperature was then further maintained for two (2) additional hours. After this two (2) additional hours of reaction time, the quantity of isocyanate (NCO) content was measured by a potentiometric titrator to ensure it was within 10% of the value of the theoretical isocyanate content that would be derivable for the oligomer from the quantities specified in Table 2A above. If the measured value was not within 10%, the reaction was allowed to continue in additional 15-minute increments and then rechecked until such value was achieved. Upon confirmation of the appropriate isocyanate content, the specified amount of the applicable endcap (e.g., 4.88 parts of HEA for oligomer 1) was added to the mixture, together with the specified amount of BHT (e.g., 0.05 parts for oligomer 1). Next the temperature was raised to 85° C. The resulting mixture was reacted for one (1) additional hour at 85° C. After allowing for this additional one (1) hour of reaction time, the NCO content was checked via potentiometric titration again. Once the isocyanate content was lower than 0.1% relative to the entire weight of the composition the reaction was considered finished. If the isocyanate content was not lower than this value, the mixture was placed back in the reaction chamber in 15-minute additional increments (again at 85° C.) and checked again, with this step repeated until the isocyanate content fell to within the desired range. Finally, the resulting synthesized oligomer was cooled slowly and discharged for use in the experiments described elsewhere herein.

Synthesis of Oligomer 11O (Outside-in)

First, the specified amount of hydroxyethyl methacrylate for oligomer 11 from Table 2A (e.g., 1.57 parts of HEMA) was charged into a 250 ml reactor together with the specified amount of BHT (e.g., 0.05 parts for oligomer 11). (equipped with a stirrer, air inlet, dropping funnel, and condenser). After charging, the reactor was heated to 45° C. before the reactor was purged with dry lean air. Then the specified amount of the applicable isocyanate (e.g., 3.15 parts of TDI for oligomer 11) was charged into the reactor whilst stirring. After this step the corresponding quantity of DBTDL (e.g., 0.05 parts for oligomer 11) was added into the reactor. After waiting one (1) hour for the reaction to commence, the temperature was then raised to 60° C. The 60° C. temperature was then further maintained for two (2) additional hours. After this two (2) additional hours of reaction time, the quantity of isocyanate (NCO) content was measured by a potentiometric titrator to ensure it was within 10% of the value of the theoretical isocyanate content that would be derivable for the oligomer from the quantities specified in Table 2A above. If the measured value was not within 10%, the reaction was allowed to continue in additional 15-minute increments and then rechecked until such value was achieved. Upon confirmation of the appropriate isocyanate content, the specified amount of the applicable polyol (e.g., 95.18 parts of PPG8000 for oligomer 11) was added to the mixture. Next the temperature was raised to 85° C. The resulting mixture was reacted for one (1) additional hour at 85° C. After allowing for this additional one (1) hour of reaction time, the NCO content was checked via potentiometric titration again. Once the isocyanate content was lower than 0.1% relative to the entire weight of the composition the reaction was considered finished. If the isocyanate content was not lower than this value, the mixture was placed back in the reaction chamber in 15-minute additional increments (again at 85° C.) and checked again, with this step repeated until the isocyanate content fell to within the desired range. Finally, the resulting synthesized oligomer was cooled slowly and discharged for use in the experiments described elsewhere herein.

Synthesis of Oligomers 19-21

First, a reaction vessel equipped with a stirrer, air inlet, dropping funnel, and condenser was charged with the specified amount of the applicable polyol from Table 2A (e.g., 89.218 parts of PPG3000 for oligomer 19). Under stirring, the specified amount of the applicable isocyanate was then added (e.g., 7.395 parts of TDI for oligomer 19) followed by the relevant amount of BHT (0.024 parts for each of oligomers 19-21). After heating to 40° C., the prescribed quantity of DBTDL (0.027 parts for each of oligomers 19-21) was added. After waiting one (1) hour for the reaction to commence, the temperature was raised slowly to 60° C. The 60° C. temperature was then further maintained for two (2) additional hours. After this two (2) hour reaction period, the quantity of isocyanate (NCO) content was measured by a potentiometric titrator to ensure it was within 10% of the value of the theoretical isocyanate content that would be derivable for the oligomer from the quantities specified in Table 2A above. If the measured value was not within 10%, the reaction was allowed to continue in additional 15-minute increments and then rechecked until such value was achieved. Upon confirmation of the appropriate isocyanate content, the temperature was raised to 70° C. and the appropriate amount of first endcap (e.g., 2.466 parts of HEA for oligomer 19) was then added. The resulting mixture was allowed to react at about 70° C. for two (2) hours. After the residual isocyanate group concentration decreased to within 10% of the theoretical content per measurements every 15 minutes with a potentiometric titrator, the prescribed quantity of 2-ethyl hexanol (e.g., 0.921 parts of EH for oligomer 19) was added and the reaction was continued for another two (2) hours. After allowing for this additional one (1) hour of reaction time, the NCO content was checked via potentiometric titration again. Once the isocyanate content was lower than 0.1% relative to the entire weight of the composition the reaction was considered finished. If the isocyanate content was not lower than this value, the mixture was placed back in the reaction chamber in 15-minute additional increments and checked again, with this step repeated until the isocyanate content fell to within the desired range. Finally, the resulting synthesized oligomer was cooled slowly and discharged for use in the experiments described elsewhere herein.

Synthesis of Oligomers 22-26

First, a 500 ml reactor equipped with a stirrer, air inlet, dropping funnel, and condenser was purged with dry air before the amounts of glycerol monomethacrylate and food grade butylated hydroxytoluene specified in Table 2A above (e.g., 0.94 and 0.03 parts for oligomers 22 and 23, respectively) were charged into reactor at room temperature. Then the specified amount of the diisocyanate (TDI) was charged into the reactor whilst stirring continued. After the initial exotherm, 0.006 parts of DBTDL was added into the reactor. After 30 minutes, the temperature was raised to 45° C., at which time the prescribed amount of the specified polyol was charged into the reactor. After addition of the polyol, 0.02 parts of DBTDL was further added into the reactor and the temperature was raised to 60° C. The 60° C. temperature was then further maintained for two (2) additional hours. After this two-hour period, the quantity of isocyanate (NCO) content was measured by a potentiometric titrator to ensure it was within 10% of the value of the theoretical isocyanate content that would be derivable for each oligomer from the quantities specified in Table 2A above. If the measured value was not within 10%, the reaction was allowed to continue in additional 15-minute increments and then rechecked until such value was achieved. Upon confirmation of the appropriate isocyanate content, the prescribed amount of the specified endcap (e.g., 1.53 parts of HEMA for oligomer 22) was added, after which the temperature was raised to 85° C., and the resulting mixture was reacted for one additional hour at 85° C. After this one-hour reaction, the NCO content was checked via potentiometric titration again. Once the isocyanate content was lower than 0.1% relative to the entire weight of the composition the reaction was considered finished. If the isocyanate content was not lower than this value, the mixture was placed back in the reaction chamber in 15-minute additional increments and checked again, with this step repeated until the isocyanate content fell to within the desired range. Finally, the resulting synthesized oligomer was cooled slowly and discharged for use in the experiments.

Reactive Oligomer Characterization

With the various reactive oligomers having been synthesized, they were then evaluated according to the size exclusion chromatography (SEC) method in accordance with ASTM: D5296-11: "Standard Test Method for Molecular Weight Averages and Molecular Weight Distribution of Polystyrene by High Performance Size-Exclusion Chromatography," ASTM International, West Conshohocken, Pa., (2011). Additionally, ASTM norm D 5226-98: "Standard Practice for Dissolving Polymer Materials," ASTM International, West Conshohocken, Pa., (2010), was used to facilitate the definition of solvents which are appropriate for polymer analysis.

Specifically, all SEC measurements were performed on a Viscotek GPCMax VE2001 solvent/sample module system, further equipped with a TDA302 triple detector array. For chromatographic separation, 3 PFG linear XL columns from PSS Polymer Standards Service GmbH were used. Detectors and columns were operated at 35° C. Prior to conducting SEC, with a single exception, each respective polymer was dissolved at a concentration ranging from 1.0 to 1.5 mg/ml in hexafluoroisopropanol (HFIP) containing 0.1 wt. % of potassium trifluoroacetate, which potassium trifluoroacetate was also used as an eluent in SEC analysis at a flow rate of 0.8 ml/min. The only exception to this was oligomer 12, which was dissolved in tetrahydrofuran as it would not readily dissolve in HFIP.

With the dissolution complete, the molar mass and molar mass distribution were then determined with the above-referenced triple detection method using the refractive index, differential viscosity and right-angle light scattering signals. For a calculation of molecular weight averages and molar mass distribution, a fixed refractive index increment (dn/dc) of 0.215 ml/g was used. The refractive index increment and molecular mass averages, as well as the molar mass distributions, were determined by integration of the whole refractive index chromatograms. An IV-DP signal was additionally used to set the integration limit. Recoveries of the samples from columns varied between 95 and 105%, which are the typical of values obtained in size-exclusion chromatography.

Using this method, number-average (Mn), weight-average (Mw), peak (Mp), and Z-average (Mz) molecular weight values were recorded and are reported in Table 2B. Also reported in Table 2B is theoretical molecular weight (Mn, theo), which was computed using the molecular mass of the individual reactants (provided in Table 1) in the ratios described under the column "Molar Ratio" (with P=polyol; ISO=diisocyanate; A/MA=acrylate and/or methacrylate; OH=hydroxyl-group containing component without a polymerizable group) in Table 2B below.

TABLE 2B

Oligomer Characterization

| Oligomer | Abbreviated Name | Molar Ratio P:ISO:A/MA:OH | Mn, theo | Mn | Mw | Mz | Mp |
|---|---|---|---|---|---|---|---|
| 1 | PPG2di HEA | 2:3:2:0 | 4755 | 5820 | 9900 | 14900 | 9800 |
| 2 | PPG3di HEA | 2:3:2:0 | 6755 | 4970 | 9500 | 14000 | 8600 |
| 3 | PPG4di HEA | 2:3:2:0 | 8755 | 6700 | 16800 | 25800 | 15500 |
| 4 | PPG8mono HEA | 1:2:2:0 | 8581 | 10100 | 13000 | 17600 | 7800 |
| 5 | PPG8di HEA | 2:3:2:0 | 16755 | 15700 | 23600 | 34800 | 19300 |
| 6 | PPG2di HEMA | 2:3:2:0 | 4783 | 5680 | 9500 | 14200 | 9600 |
| 7 | PPG2tri HEMA | 3:4:2:0 | 6957 | 8100 | 14900 | 23100 | 14000 |
| 8 | PPG3di HEMA | 2:3:2:0 | 6783 | 4000 | 9200 | 14000 | 8400 |
| 9 | PPG4di HEMA | 2:3:2:0 | 8783 | 6520 | 17600 | 26900 | 16100 |
| 10 | PPG8mono HEMA | 1:2:2:0 | 8609 | 9900 | 12300 | 16400 | 7700 |
| 11 | PPG8di HEMA | 2:3:2:0 | 16783 | 17400 | 29800 | 45800 | 25700 |
| 11-O | PPG8di HEMA (outside-in) | 2:3:2:0 | 16783 | 16300 | 25100 | 37400 | 20500 |
| 12 | HPB3di HEMA | 2:3:2:0 | 6783 | 5540 | 12300 | 13300 | 19200 |
| 13 | PTHF2tri HEMA | 3:4:2:0 | 6957 | 6700 | 14000 | 21700 | 15600 |
| 14 | PPG4di TMDI HEMA | 2:3:2:0 | 8891 | 7500 | 15600 | 24000 | 14300 |
| 15 | PPG8mono IPDI HEMA | 1:2:2:0 | 8705 | 10900 | 14600 | 21000 | 7900 |
| 16 | PPG4di AMG | 2:3:2:0 | 8951 | 8600 | 16900 | 25400 | 15300 |
| 17 | PPG4di DMG | 2:3:2:0 | 8979 | 8700 | 18100 | 27800 | 16600 |

TABLE 2B-continued

Oligomer Characterization

| Oligomer | Abbreviated Name | Molar Ratio P:ISO:A/MA:OH | Mn, theo | Mn | Mw | Mz | Mp |
|---|---|---|---|---|---|---|---|
| 18 | PPG4di eTMPDA | 2:3:2:0 | 9798 | 3310 | 23400 | 40200 | 20600 |
| 19 | PPG3di HEA/EH | 2:3:1.5:0.5 | 6762 | 4210 | 9400 | 13800 | 8500 |
| 20 | PPG3di HEMA/EH | 2:3:1.5:0.5 | 6783 | 5270 | 9800 | 14300 | 8600 |
| 21 | PPG3di AMG/EH | 2:3:1.5:0.5 | 6909 | 5700 | 10200 | 14800 | 9100 |
| 22 | PPG8di GMM HEMA | 2:4:3:0 (1 GMM, 2 HEMA) | 17117 | 19900 | 31400 | 47800 | 26400 |
| 23 | PPG8di GMM HEA | 2:4:3:0 (1 GMM, 2 HEA) | 17089 | 18700 | 31000 | 47900 | 25900 |
| 24 | PPG8di GMM eTMPDA | 2:4:3:0 (1 GMM, 2 eTMPDA) | 18133 | 31000 | 56400 | 95000 | 42100 |
| 25 | PPG8di GMM AMG | 2:4:3:0 (1 GMM, 2 AMG) | 17285 | 21300 | 34300 | 50000 | 29200 |
| 26 | PPG8di GMM DMG | 2:4:3:0 (1 GMM, 2 DMG) | 17313 | 18500 | 32000 | 46600 | 27700 |

Determination of Reactivity Ratios

To determine reactivity ratios, RT-FTIR has been employed for monitoring the conversions of the different components in accordance with J. F. G. A. Jansen, Erwin E. J. E. Houben, Peter H. G. Tummers, Dietrich Wienke, John Hoffmann, "Real-Time Infrared Determination of Photoinitiated Copolymerization Reactivity Ratios: Application of the Hilbert Transform and Critical Evaluation of Data Analysis Techniques". Macromolecules, 37, 2275 (2004). Multivariate analysis was performed using the IR spectra of the pure components as input.

Specifically, the reactivity ratios of several methacrylate monomers used in oligomers described herein, supra, were determined in a copolymerization with 2-hydroxyethyl acrylate (HEA). $R_1$ represents the self-reactivity ratio of the component with itself, whereas $R_2$ represents its relative reactivity ratio with the associated HEA. The results are reported in Table 2C below:

TABLE 2C

Reactivity Ratios

| | $R_1$ | $R_2$ | $R_1/R_2$ |
|---|---|---|---|
| HEMA | 1.6 | 0.15 | 10.7 |
| AMG | 1.5 | 0.15 | 10.0 |
| DMG | 1.45 | 0.35 | 4.1 |
| GMM | 3 | 0.35 | 8.6 |

Formulations 1-99

Each of the formulations described in Tables 3A-3E below were prepared by conventional methods by using a 50 ml mixing cup suitable for use with a Speedmixer™. Specifically, 1 part by weight of the photoinitiator TPO was added to the amount of oligomer specified in Tables 3A through 3E below, followed by the prescribed amounts of monomer(s) resulting in 10 g in total. The cup was then closed and vigorously mixed in a Speedmixer™ DAC150FVZ 30 seconds, stopped, and mixed again for 30 additional seconds via the same method.

These samples were tested according to the methods described below for determining each formulation's total molar fraction of methacrylate groups (out of all polymerizable groups present in each formulation), the $T_{30\%, \, modulus \, max}$, Max. G', molar fraction of methacrylate groups in the oligomer component, and molar fraction of acrylate, acrylamide, and N-vinyl amide groups in the reactive diluent monomer component, respectively. Values for these measured characteristics are reported in Tables 3A-3E below.

Calculation of Molar Fraction of Various Polymerizable Groups

The molar fraction of various polymerizable groups was determined by a calculation-based method using theoretical molecular weight values (Mn, theo) as described further herein, although measurement-based methods can also be appreciated by the skilled artisan to which this invention applies for situations in which Mn, theo values are not available. As reported herein, the molar fraction is determined by dividing the molar quantity of the desired polymerizable group type(s) by the molar quantity of all polymerizable groups in a particular compositional component (or alternatively the entire composition itself where specified). Molar quantities are determined by summing the molar amounts for each relevant polymerizable group-containing compositional constituent, wherein values for each constituent are determined according to the following formula:

$$\frac{f * \text{wt. \%}}{Mn, \text{theo}},$$

in which f represents the number of relevant desired polymerizable groups per molecule of a given compositional constituent, wt. % is the weight percentage of the relevant desired polymerizable group-containing constituent relative to the total formulation, and Mn, theo is the theoretical molecular weight of the specific compositional constituent into which such polymerizable group is incorporated. Mn, theo values of the oligomers used are reported in Table 2B, while Mn, theo values for the monomers used are provided above in Table 1.

For purposes herein, all methacrylate, acrylate, acrylamide, and N-vinyl amide groups are considered to be polymerizable groups, although other such groups for other formulations not depicted herein will be readily appreciated by the person having ordinary skill in the art to which this invention applies. For the avoidance of doubt as used herein, hydroxyl groups are not considered to be polymerizable groups. The aforementioned molar quantity calculation method was used to determine three different types of molar fraction values for each formulation (as reported in Tables 3A through 3E below): "% MA Oligomer" and "% AAN Monomer", and "Mol % Meth."

For the column headed by "% MA Oligomer", the values expressed in Tables 3A-3E below represent the molar fraction of methacrylate groups in the oligomer component relative to all polymerizable groups in the oligomer component. By way of example, formulation 45—the oligomer component of which consisted of equal parts by weight of the reactive oligomers PPG8di HEMA and PPG8di HEA—possesses a "% MA Oligomer" value of 49.96%. Such value was determined to be less than 50% because the theoretical molecular weight of PPG8di HEMA is slightly higher than its acrylate analogue. The specific calculation for this is depicted in Table 2D below:

TABLE 2D

% MA Oligomer calculation methodology for formulation 45

| Component | Polymerizable Group Type | # of such groups/ oligomer molecule | Wt. % in total formulation | Mn, theo of component | Molar content |
|---|---|---|---|---|---|
| PPG8di HEMA | Methacrylate | 2 | 34.65 | 16783 | 0.004129 |
| PPG8di HEA | Acrylate | 2 | 34.65 | 16755 | 0.004136 |
| | | | TOTAL | | 0.008265 |

The "% MA Oligomer" value was then determined by calculating 0.004129/0.008265, and then expressing that value as a % (i.e. ×100).

For the column headed by "% AAN Monomer", meanwhile, now the molar fraction of acrylate, acrylamide, and N-vinyl amide groups in the entire reactive diluent monomer component were determined as a fraction out of all polymerizable groups in the reactive diluent monomer component. By way of example, the % AAN Monomer" in formulation 15 would be 93.7%, the calculation for which is produced in Table 2E below:

TABLE 2E

% AAN Monomer calculation methodology for formulation 15

| Component | Polymerizable Group Type | # of such groups/ monomer molecule | Wt. % in total formulation | Mn, theo of component | Molar content |
|---|---|---|---|---|---|
| EHA | Acrylate | 1 | 27.80 | 184.28 | 0.1509 |
| TGDMA | Methacrylate | 2 | 1.46 | 286.32 | 0.0102 |
| | | | TOTAL | | 0.1611 |

The "% AAN Monomer" value was then determined by calculating 0.1509/0.1611, and then expressing that value as a % (i.e. ×100).

Finally, for the column headed by "Mol % Meth.", now the molar fraction of all methacrylate groups in the entire composition was determined as a fraction of all polymerizable groups in the entire composition. By way of example, the "Mol % Meth." of formulation 98 is 6.6%, the calculation basis for which is produced in Table 2F below:

TABLE 2F

% Mol Meth. calculation methodology for formulation 98

| Component | Polymerizable Group Type | # of such groups/ molecule | Wt. % in total formulation | Mn, theo of component | Molar content |
|---|---|---|---|---|---|
| PPG8di GMM | Methacrylate | 3 | 69.3 | 17285 | 0.0120 |
| AMG | Acrylate | 2 | | | 0.0080 |
| EHA | Acrylate | 1 | 29.7 | 184.28 | 0.1611 |
| | | | TOTAL | | 0.1812 |

The "% Mol Meth." value was then determined by calculating 0.0120/0.1812, and then expressing that value as a % (i.e. ×100).

Determination of Maximum Modulus (G) and $T_{30\%, modulus\ max}$ Values

Values for Maximum Modulus (G') were determined according to the following procedure described herein. The hardware/equipment used in this procedure was as follows:

Rheometer+Accessories

ARESG2-rheometer (manufacturer: TA Instruments)

APS temperature control device (Advanced Peltier System)

APS Standard Flat Plate (lower geometry)

ARESG2 UV-curing Accessory (upper plate fixture, UV-light shield back & access door, collimating optic lens)

Ø20 mm acrylic plate with the UV-curing Option upper plate fixture (upper geometry)

Silverline UV radiometer, UV-light sensor (non-calibrated), UV-sensor geometry and disposable plate holder UV-Light Source & Other Omnicure LX500 in combination with 385 nm LED and 8 mm lens attached Moeller Easy 412-DC-TC Control Relay (trigger box)

UV Power Puck II (Electronic Instrumentation & Technology, calibrated)

The hardware described above was then set-up and arranged according to the following: First, UV-curing measurements were performed on the ARESG2 rheometer (TA Instruments). The rheometer was equipped with the APS temperature control device, the APS Standard Flat Plate as lower geometry and the ARESG2 UV-curing Option. The upper geometry used was the upper plate fixture from the ARESG2 UV-curing Option in combination with a 20 mm diameter acrylic plate. As the UV-light source, the Omnicure LX500 spot curing system was used in combination with 385 nm LED (8 mm lens). The 385 nm LED was then inserted into the collimating optic lens of the ARES G2 UV-curing accessory. The collimating lens was fixed to the light shield and aligned to the upper UV geometry mirror and the alignment screws were tightened. The diameter of the original 5 mm lightguide holder part of the collimating lens was increased to 12 mm in order to accommodate the 385 nm UV-LED.

Then, the Omnicure LX500 spot curing system was connected via a Moeller Easy 412-DC-TC Control Relay to the DIGITAL I/O connector at the ARESG2. The Control Relay served as a trigger-box for the UV-light source. The delay time of the trigger was set to 1.5 seconds, meaning that the 385 nm UV-LED was automatically switched on with a delay of 1.5 seconds after the start of the data collection of the modulus measurement on the ARESG2. The light intensity was set to 95%, and the duration of the UV-light was fixed to 128 seconds.

Alignment of the UV-Light:

Alignment was performed prior to installation of the APS temperature control unit. The UV sensor geometry was attached to a disposable plate holder and installed as the lower geometry. The UV-light sensor, which was connected to Silverline UV-radiometer, was positioned in the outer hole of the UV sensor geometry. The upper geometry was positioned on top of the UV-light sensor by applying approximately 100 grams of axial force. Then, the light intensity was measured at four locations by rotating the lower geometry approximately 90° between each successive measurement. In order to achieve a light distribution at each point which was as equal as possible, the alignment of the collimating lens was then adjusted with the alignment screws on the light shield. The difference in light intensity at the four different positions was maintained to below 10%.

Determination of Light Intensity:

Prior to the RT-DMA measurements, the UV-intensity was measured with help of a calibrated UV Power Puck II. To achieve this, the sensor of the UV Power Puck II was positioned directly below the surface of the 20 mm acrylic plate in the upper plate fixture (distance <0.5 mm) with the surface of the acrylic plate completely covering the sensor surface. Next, the Omnicure LX500 UV-source (with an intensity value set to 95%) was manually switched on for 10 seconds. During this 10 second interval, the UVA2 intensity (i.e. radiation between wavelengths of 380-410 nm) was measured with the UV Power Puck II instrument. The measured UVA2 intensity was determined to be between 60-70 mW/cm$^2$, with an actual value of 67 mW/cm$^2$ recorded.

Determination of the Actual Delay Time:

When starting a measurement, there was a delay between the start of data sampling and the start of UV-illumination. In the settings of the Moeller Easy 412-DC-TC Control Relay, the delay was set to 1.5 seconds, which signifies that the UV-illumination began 1.5 seconds after the initiation of data sampling.

With help of a Light Dependent Resistance (LDR) and an oscilloscope (PicoScope 3424) an actual delay time of 1.519 s was measured. The delay time of 1.519 seconds was the measured average value of 10 individual measurements with a standard deviation of 0.004 seconds.

Rt-Dma Measurement:

The RT-DMA UV-curing measurements were then performed using an ARESG2 rheometer paired with the Advanced Peltier System as a temperature control device, the APS Flat Plate, and the ARESG2 UV-curing Accessory set up. A 385 nm LED with an 8-mm lens connected to the Omnicure LX500 was used as the UV light source.

Sample Loading:

Prior to loading each respective sample, the temperature of the bottom plate was set to 50° C. When the temperature reached 50° C., the surface of the upper plate (which was an acrylic plate with a thickness of 20 mm) was brought into contact (i.e. a gap of 0 mm with the lower plate by applying an axial force of between 200-400 grams, thereby allowing the upper parallel plate to equilibrate to the set temperature of 50° C. The system was allowed to further equilibrate its temperature for at least 5 minutes after initial contact. Next, a zero-fixture procedure was performed according to well-known methods to determine the gap=0 position. After determining the gap=0 position, the upper plate was moved to a position of 10 mm away. Then a portion of each respective sample was transferred to the center of the lower plate with the tip of a small spatula, after which the upper geometry was lowered to a gap=0.120 mm position. The quantity of the sample had to be sufficient to ensure than an excess would be pushed outside of the gap covering the entire circumference of the upper parallel plate after the upper geometry was brought down to the reduced gap. Next, the excess of sample that had been displaced outside of the gap was removed, and the upper geometry was brought down further to the measuring position (having a gap=0.100 mm). With the measuring position loaded, the temperature of the sample was allowed to equilibrate to 50° C. Finally, when the sample temperature was measured as stable between 49.90 and 50.10° C., the measurement process would commence by activating the trigger box (Moeller Easy 412-DC-TC) and using the interface and interconnection provided by the TRIOS software package.

Measurement:

The actual UV cure RT-DMA measurement was a so-called "fast sampling" measurement taken at 50° C. That is, it was an oscillation fast sampling taken at 50° C. for a duration of 128 seconds, with a 1% strain, a rotational velocity of 52.36 rad/s, and a measurement frequency of 50 points per second (i.e. 0.020 seconds between each successive measurement point).

Then, the measurement was started via the start button in the TRIOS software. Once the data sampling started, the rheometer sent a signal to the control relay, which in turn activated the Omnicure LX500 UV-light source to illuminate the respective sample with the aforementioned delay of 1.519 s after commencement of data sampling. The sample was illuminated with the 385 nm UV-light (Intensity 60-70 mW/cm$^2$) during 128 seconds of fast sampling data collection as described above. After the measurement was finished, the TRIOS data file was exported to Microsoft Excel. Then the sample was removed and the plates subsequently cleaned thoroughly with ethanol prior to loading of the next sample.

Data Analysis:

As mentioned, the TRIOS data was exported to Microsoft Excel. Excel was used to plot graphs and calculate various parameters for characterization of the cure speed performance of the tested formulations as described below. The graphs included those corresponding to storage modulus (G') as a function of UV-time (UV-time was calculated by subtracting the delay time (1.519 s) from the actual time for each individual data point), and relative storage modulus (rel G') as function of UV-time (rel G' was calculated by the quotient of the measured G' value at certain UV-time and the maximum obtained G' value during the cure measurement). The maximum value observed of the graph of the G' graph was determined by taking the average of the G' value between 110 and 120 seconds, and is reported in Tables 3A through 3E below under the column headed by "Max. G'". For samples that did not fully cure during the testing time, this column is indicated with the designation "NFC," indicating a Max. G' was not attainable given the test procedure and time limits employed.

The characteristic parameters, meanwhile, included: (1) the time to reach 30% of the total storage modulus (G') increase, and (2) average G' 110-120 s (Average storage modulus value out of 6 datapoints towards the end of the cure measurement). The results for (1) of each formulation is reported in Tables 3A-3E below under the column headed by $T_{30\%, modulus\ max}$.

TABLE 3A

Amounts are listed in parts by weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%}$, modulus max | Max G' | % MA Oligomer | % AAN Monomer |
|---|---|---|---|---|---|---|---|---|---|---|---|---|
| 1 | 11 | PPG8di HEMA | 70 | PEA | 30 | | | 5.1 | 0.52 | 0.35 | 100 | 100 |
| 2 | 11 | PPG8di HEMA | 70 | PEMA | 30 | | | 100 | >15.6 | NFC | 100 | 0 |
| 3 | 11 | PPG8di HEA | 70 | PEA | 30 | | | 0 | 0.92 | 0.37 | 0 | 100 |
| 4 | 5 | PPG8di HEA | 70 | PEMA | 30 | | | 95 | >21 | NFC | 0 | 0 |
| 5 | 11 | PPG8di HEMA | 70 | EHA | 30 | | | 4.9 | 0.98 | 0.22 | 100 | 100 |
| 6 | 11 | PPG8di HEMA | 70 | EHMA | 30 | | | 100 | >47.8 | NFC | 100 | 0 |
| 7 | 5 | PPG8di HEA | 70 | EHA | 30 | | | 0 | 1.98 | 0.21 | 0 | 100 |
| 8 | 5 | PPG8di HEA | 70 | EHMA | 30 | | | 95 | >50 | NFC | 0 | 0 |
| 9 | 3 | PPG4di HEA | 70 | EHA | 30 | | | 0 | 2.51 | 0.20 | 0 | 100 |
| 10 | 3 | PPG4di HEA | 70 | EHA | 29.5 | TGDA | 0.5 | 0 | 2.41 | 0.23 | 0 | 100 |
| 11 | 3 | PPG4di HEA | 70 | EHA | 29 | TGDA | 1.0 | 0 | 2.28 | 0.25 | 0 | 100 |
| 12 | 3 | PPG4di HEA | 70 | EHA | 28.5 | TGDA | 1.5 | 0 | 2.18 | 0.27 | 0 | 100 |
| 13 | 3 | PPG4di HEA | 70.5 | EHA | 29.5 | TGDMA | 0.5 | 1.9 | 3.14 | 0.20 | 0 | 97.9 |
| 14 | 3 | PPG4di HEA | 71 | EHA | 29 | TGDMA | 1.0 | 3.9 | 3.79 | 0.20 | 0 | 95.8 |
| 15 | 3 | PPG4di HEA | 71.5 | EHA | 28.5 | TGDMA | 1.5 | 5.8 | 4.61 | 0.18 | 0 | 93.7 |
| 16 | 11 | PPG8di HEMA | 50 | PEA | 50 | | | 2.2 | 0.60 | 0.29 | 100 | 100 |
| 17 | 11 | PPG8di HEMA | 60 | PEA | 40 | | | 3.3 | 0.56 | 0.30 | 100 | 100 |
| 18 | 11 | PPG8di HEMA | 80 | PEA | 20 | | | 8.4 | 0.55 | 0.39 | 100 | 100 |
| 19 | 11 | PPG8di HEMA | 50 | EHA | 50 | | | 2.1 | 1.16 | 0.13 | 100 | 100 |
| 20 | 11 | PPG8di HEMA | 60 | EHA | 40 | | | 3.2 | 1.05 | 0.17 | 100 | 100 |
| 21 | 11 | PPG8di HEMA | 80 | EHA | 20 | | | 8.1 | 0.95 | 0.28 | 100 | 100 |
| 22 | 11 | PPG8di HEMA | 50 | ENPA | 50 | | | 5.1 | 0.45 | 0.18 | 100 | 100 |
| 23 | 11 | PPG8di HEMA | 60 | ENPA | 40 | | | 7.4 | 0.49 | 0.22 | 100 | 100 |
| 24 | 11 | PPG8di HEMA | 70 | ENPA | 30 | | | 11.1 | 0.53 | 0.27 | 100 | 100 |
| 25 | 11 | PPG8di HEMA | 80 | ENPA | 20 | | | 17.7 | 0.62 | 0.32 | 100 | 100 |
| 26 | 1 | PPG2di HEA | 70 | PEA | 30 | | | 0 | 0.57 | 0.62 | 0 | 100 |
| 27 | 6 | PPG2di HEMA | 70 | PEA | 30 | | | 15.8 | 0.63 | 0.65 | 100 | 100 |
| 28 | 2 | PPG3di HEA | 70 | PEA | 30 | | | 0 | 0.80 | 0.48 | 0 | 100 |
| 29 | 8 | PPG3di HEMA | 70 | PEA | 30 | | | 11.7 | 0.66 | 0.46 | 100 | 100 |
| 30 | 4 | PPG8mono HEA | 70 | PEA | 30 | | | 0 | 0.70 | 0.51 | 0 | 100 |
| 31 | 10 | PPG8mono HEMA | 70 | PEA | 30 | | | 9.4 | 0.58 | 0.46 | 100 | 100 |
| 32 | 12 | HPB3di HEMA | 70 | EHA | 30 | | | 11.2 | 0.47 | 0.22 | 100 | 100 |
| 33 | 13 | PTHF2tri HEMA | 70 | PEA | 30 | | | 11.4 | 0.47 | 0.74 | 100 | 100 |
| 34 | 14 | PPG4di TMDI HEMA | 70 | PEA | 30 | | | 9.2 | 0.94 | 0.30 | 100 | 100 |
| 35 | 15 | PPG8mono IPDI HEMA | 70 | PEA | 30 | | | 9.1 | 0.70 | 0.41 | 100 | 100 |
| 36 | 7 | PPG2tri EMMA | 70 | PEA | 30 | | | 11.4 | 0.58 | 0.52 | 100 | 100 |
| 37 | 9 | PPG4di HEMA | 70 | PEA | 30 | | | 9.3 | 0.80 | 0.32 | 100 | 100 |
| 38 | 10 | PPG8mono HEMA | 65 | PEA | 35 | | | 7.7 | 0.56 | 0.44 | 100 | 100 |
| 39 | 10 | PPG8mono HEMA | 75 | PEA | 25 | | | 11.8 | 0.60 | 0.47 | 100 | 100 |
| 40 | 5 | PPG8di HEA | 70 | EHA | 25 | NVC | 5 | 0 | 0.75 | 0.28 | 0 | 100 |
| 41 | 11 | PPG8di HEMA | 70 | EHA | 25 | NVC | 5 | 4.6 | 0.68 | 0.26 | 100 | 100 |

TABLE 3A-continued

Amounts are listed in parts by weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%,\,modulus\,max}$ | Max G' | % MA Oligomer | % AAN Monomer |
|---|---|---|---|---|---|---|---|---|---|---|---|---|
| 42 | 11 | PPG8di HEMA | 70 | EHA | 20 | NVC | 10 | 4.4 | 0.56 | 0.29 | 100 | 100 |
| 43 | 11 | PPG8di HEMA | 70 | EHA | 15 | IBOA | 15 | 5.1 | 0.92 | 0.23 | 100 | 100 |
| 44 | 11 | PPG8di HEMA | 70 | EHA | 15 | ACMO | 15 | 4.2 | 0.46 | 0.36 | 100 | 100 |
| 45 | 11 & 5 | 1:1 wt. ratio of PPG8di HEMA & PPG8di HEA | 70 | PEA | 30 | | | 2.5 | 0.65 | 0.33 | 49.96 | 100 |

TABLE 3B

Formulations 46-67. Amounts are listed in parts by weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%, modulus\ max}$ | Max G' | % MA Oligomer | % AAN Monomer |
|---|---|---|---|---|---|---|---|---|---|---|---|---|
| 46 | 3 | PPG4di HEA | 70 | PEA | 30 | | | 0 | 0.84 | 0.38 | 0 | 100 |
| 47 | 18 | PPG4di eTMPDA | 70 | PEA | 30 | | | 0 | 0.63 | 0.47 | 0 | 100 |
| 48 | 9 | PPG4di HEMA | 70 | PEA | 30 | | | 9.3 | 0.80 | 0.32 | 100 | 100 |
| 49 | 16 | PPG4di AMG | 70 | PEA | 30 | | | 8.3 | 0.52 | 0.58 | 50 | 100 |
| 50 | 17 | PPG4di DMG | 70 | PEA | 30 | | | 16.6 | 0.63 | 0.48 | 100 | 100 |
| 51 | 3 | PPG4di HEA | 60 | EHA | 40 | | | 0 | 3.03 | 0.15 | 0 | 100 |
| 52 | 3 | PPG4di HEA | 70 | EHA | 30 | | | 0 | 2.51 | 0.20 | 0 | 100 |
| 53 | 3 | PPG4di HEA | 80 | EHA | 20 | | | 0 | 2.01 | 0.25 | 0 | 100 |
| 54 | 18 | PPG4di eTMPDA | 60 | EHA | 40 | | | 0 | 2.09 | 0.28 | 0 | 100 |
| 55 | 18 | PPG4di eTMPDA | 70 | EHA | 30 | | | 0 | 1.80 | 0.32 | 0 | 100 |
| 56 | 18 | PPG4di eTMPDA | 80 | EHA | 20 | | | 0 | 1.47 | 0.36 | 0 | 100 |
| 57 | 16 | PPG4di AMG | 60 | EHA | 40 | | | 5.5 | 1.16 | 0.34 | 50 | 100 |
| 58 | 16 | PPG4di AMG | 70 | EHA | 30 | | | 8.3 | 0.93 | 0.38 | 50 | 100 |
| 59 | 16 | PPG4di AMG | 80 | EHA | 20 | | | 12.4 | 0.77 | 0.48 | 50 | 100 |
| 60 | 17 | PPG4di DMG | 60 | EHA | 40 | | | 11 | 1.15 | 0.24 | 100 | 100 |
| 61 | 17 | PPG4di DMG | 70 | EHA | 30 | | | 16.6 | 1.03 | 0.31 | 100 | 100 |
| 62 | 17 | PPG4di DMG | 80 | EHA | 20 | | | 24.7 | 0.92 | 0.39 | 100 | 100 |
| 63 | 16 | PPG4di AMG | 70 | EHA | 25 | NVC | 5 | 7.7 | 0.77 | 0.48 | 50 | 100 |
| 64 | 16 | PPG4di AMG | 60 | EHA | 30 | NVC | 10 | 5.1 | 0.69 | 0.38 | 50 | 100 |
| 65 | 17 | PPG4di DMG | 70 | EHA | 25 | NVC | 5 | 15.4 | 0.92 | 0.37 | 100 | 100 |
| 66 | 17 | PPG4di DMG | 60 | EHA | 30 | NVC | 10 | 10.2 | 0.89 | 0.30 | 100 | 100 |
| 67 | 17 | PPG4di DMG | 50 | EHA | 40 | NVC | 10 | 7.1 | 0.99 | 0.23 | 100 | 100 |

TABLE 3C

Formulations 68-78. All amounts listed in parts per weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%, modulus\ max}$ | Max G' | % MA Oligomer | % AAN Monomer |
|---|---|---|---|---|---|---|---|---|---|---|---|---|
| 68 | 2 | PPG3di HEA | 70 | EHA | 30 | | | 0 | 1.63 | 0.33 | 0 | 100 |
| 69 | 8 | PPG3di HEMA | 70 | EHA | 30 | | | 11.2 | 1.04 | 0.31 | 100 | 100 |
| 70 | 19 | PPG3di HEA/EH | 70 | EHA | 30 | | | 0 | 1.94 | 0.16 | 0 | 100 |
| 71 | 19 | PPG3di HEA/EH | 60 | EHA | 40 | | | 0 | 2.28 | 0.12 | 0 | 100 |
| 72 | 19 | PPG3di HEA/EH | 60 | EHA | 35 | NVC | 5 | 0 | 1.04 | 0.16 | 0 | 100 |
| 73 | 20 | PPG3di HEMA/EH | 70 | EHA | 30 | | | 8.7 | 1.02 | 0.17 | 100 | 100 |
| 74 | 20 | PPG3di HEMA/EH | 60 | EHA | 40 | | | 5.8 | 1.07 | 0.14 | 100 | 100 |
| 75 | 20 | PPG3di HEMA/EH | 60 | EHA | 35 | NVC | 5 | 5.5 | 0.86 | 0.12 | 100 | 100 |
| 76 | 21 | PPG3di AMG/EH | 70 | EHA | 30 | | | 7.9 | 0.76 | 0.28 | 50 | 100 |
| 77 | 21 | PPG3di AMG/EH | 60 | EHA | 40 | | | 5.4 | 0.88 | 0.23 | 50 | 100 |
| 78 | 21 | PPG3di AMG/EH | 60 | EHA | 35 | NVC | 5 | 5.2 | 0.64 | 0.23 | 50 | 100 |

TABLE 3D

Formulations 79-93. All amounts listed in parts per weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%, modulus\ max}$ | Max G' | % MA Oligomer | % AAN Monomer |
|---|---|---|---|---|---|---|---|---|---|---|---|---|
| 79 | 5 | PPG8di HEA | 70 | PEA | 30 | | | 0 | 0.92 | 0.37 | 0 | 100 |
| 30 | 4 | PPG8mono HEA | 70 | PEA | 30 | | | 0 | 0.70 | 0.51 | 0 | 100 |
| 80 | 23 | PPG8di GMM HEA | 70 | PEA | 30 | | | 2.4 | 0.49 | 0.44 | 33.33 | 100 |
| 81 | 11 | PPG8di HEMA | 70 | PEA | 30 | | | 5.1 | 0.52 | 0.35 | 100 | 100 |
| 31 | 10 | PPG8mono HEMA | 70 | PEA | 30 | | | 9.4 | 0.58 | 0.46 | 100 | 100 |
| 82 | 22 | PPG8di GMM HEMA | 70 | PEA | 30 | | | 7.3 | 0.39 | 0.37 | 100 | 100 |
| 83 | 5 | PPG8di HEA | 70 | EHA | 30 | | | 0 | 1.98 | 0.21 | 0 | 100 |
| 84 | 11 | PPG8di HEMA | 70 | EHA | 30 | | | 4.9 | 0.98 | 0.22 | 100 | 100 |
| 85 | 23 | PPG8di GMM HEA | 70 | EHA | 30 | | | 2.3 | 0.99 | 0.30 | 33.33 | 100 |

TABLE 3D-continued

Formulations 79-93. All amounts listed in parts per weight. All compositions contain 1 part by weight TPO.

| Formulation | Oligomer | Oligomer Name | Oligomer Amt. | Monomer 1 | Monomer 1 Amt. | Monomer 2 | Monomer 2 Amt. | Mol % Meth. | $T_{30\%}$, modulus max | Max G' | % MA Oligomer | % AAN Monomer |
|---|---|---|---|---|---|---|---|---|---|---|---|---|
| 86 | 5 | PPG8di HEA | 70 | EHA | 25 | NVC | 5 | 0 | 0.75 | 0.28 | 0 | 100 |
| 87 | 23 | PPG8di GMM HEA | 70 | EHA | 25 | NVC | 5 | 2.2 | 0.50 | 0.35 | 33.33 | 100 |
| 88 | 23 | PPG8di GMM HEA | 70 | EHA | 20 | NVC | 10 | 2.1 | 0.35 | 0.40 | 33.33 | 100 |
| 89 | 23 | PPG8di GMM HEA | 60 | EHA | 30 | NVC | 10 | 1.4 | 0.44 | 0.31 | 33.33 | 100 |
| 90 | 22 | PPG8di GMM HEMA | 70 | EHA | 30 | | | 7.0 | 0.62 | 0.29 | 100 | 100 |
| 91 | 22 | PPG8di GMM HEMA | 70 | EHA | 25 | NVC | 5 | 6.7 | 0.48 | 0.32 | 100 | 100 |
| 92 | 22 | PPG8di GMM HEMA | 70 | EHA | 20 | NVC | 10 | 6.4 | 0.41 | 0.37 | 100 | 100 |
| 93 | 22 | PPG8di GMM HEMA | 60 | EHA | 30 | NVC | 10 | 4.3 | 0.45 | 0.29 | 100 | 100 |

TABLE 3E

Formulations 94-99. All amounts listed in parts per weight. All compositions contain 1 part by weight TPO.

| Formulation | Oligomer | Oligomer Name | Oligomer Amt. | Monomer 1 | Monomer 1 Amt. | Mol % Meth. | $T_{30\%}$, modulus max | Max G' | % MA Oligomer | % AAN Monomer |
|---|---|---|---|---|---|---|---|---|---|---|
| 3 | 5 | PPG8di HEA | 70 | PEA | 30 | 0 | 0.92 | 0.37 | 0 | 100 |
| 1 | 11 | PPG8di HEMA | 70 | PEA | 30 | 5.1 | 0.52 | 0.35 | 100 | 100 |
| 80 | 23 | PPG8di GMM HEA | 70 | PEA | 30 | 2.4 | 0.49 | 0.44 | 33.33 | 100 |
| 82 | 22 | PPG8di GMM HEMA | 70 | PEA | 30 | 7.3 | 0.39 | 0.37 | 100 | 100 |
| 94 | 24 | PPG8di GMM eTMPDA | 70 | PEA | 30 | 2.1 | 0.36 | 0.38 | 20 | 100 |
| 95 | 25 | PPG8di GMM AMG | 70 | PEA | 30 | 6.9 | 0.34 | 0.43 | 60 | 100 |
| 96 | 26 | PPG8di GMM DMG | 70 | PEA | 30 | 11.5 | 0.39 | 0.38 | 100 | 100 |
| 7 | 5 | PPG8di HEA | 70 | EHA | 30 | 0 | 1.98 | 0.21 | 0 | 100 |
| 5 | 11 | PPG8di HEMA | 70 | EHA | 30 | 4.9 | 0.98 | 0.22 | 100 | 100 |
| 85 | 23 | PPG8di GMM HEA | 70 | EHA | 30 | 2.3 | 0.99 | 0.30 | 33.33 | 100 |
| 90 | 22 | PPG8di GMM HEMA | 70 | EHA | 30 | 7.0 | 0.62 | 0.29 | 100 | 100 |
| 97 | 24 | PPG8di GMM eTMPDA | 70 | EHA | 30 | 2.1 | 0.73 | 0.29 | 20 | 100 |
| 98 | 25 | PPG8di GMM AMG | 70 | EHA | 30 | 6.6 | 0.53 | 0.33 | 60 | 100 |
| 99 | 26 | PPG8di GMM DMG | 70 | EHA | 30 | 11.0 | 0.56 | 0.31 | 100 | 100 |

Discussion of Results

Formulations 1-4 show that with compositions according to the invention, a faster modulus build-up may be obtained. Specifically, the composition with a methacrylate-functional reactive oligomer component and an acrylate-functional reactive diluent monomer component (1) exhibited a faster modulus-build up (as measured by $T_{30\%, modulus\ max}$) and lower modulus (as measured by G') than direct analogues using methacrylate/methacrylate (2), acrylate/acrylate (3), and acrylate/methacrylate (4) functionality in the reactive oligomer and diluent monomer components, respectively. The graphical results of this comparison of modulus build-up are depicted in FIG. 1. Turning to FIG. 1, the relative modulus based upon G' max (in %) is plotted on the y-axis for four formulations (1-4) as a function of time (in seconds) on the x-axis. Even though acrylate-functionalized oligomer of formulation 3 attains a comparable ultimate modulus build-up to formulation 1, formulation 1 (which is according to the present invention) achieves a significantly faster relative modulus buildup, suggesting a more-ready suitability for higher line processing speeds in optical fiber coating processes. Formulations 2 and 4, meanwhile, exhibit poor modulus buildup.

Figure 2:
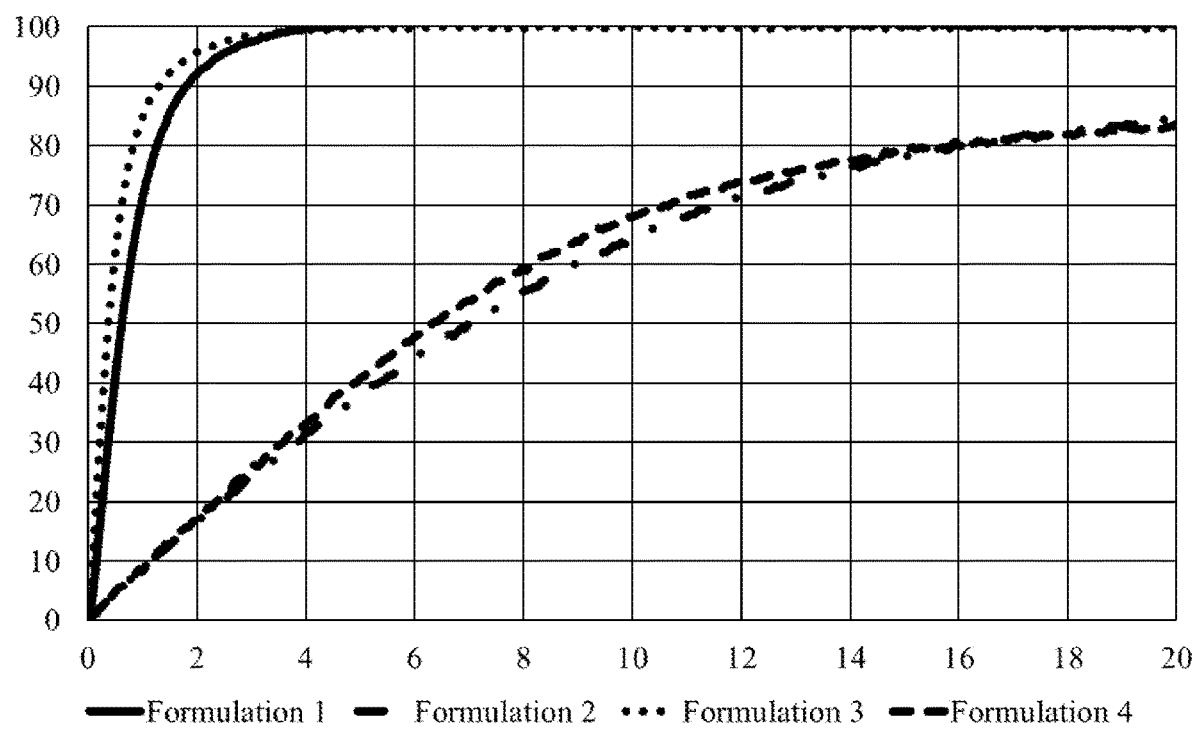
FIG. 2 shows a graph of the % reacted unsaturation of the same radiation curable compositions depicted in FIG. 1 as a function of time.

This relative improvement in modulus build-up rate is particularly surprising given the observations that the all-acrylate control formulation 3 attains a faster nominal cure speed in terms of a % reacted (meth)acrylate unsaturation (% RAU) metric when compared with formulation 1. This phenomenon can be evidenced in FIG. 2. Turning to FIG. 2., the % RAU for each of formulations 1-4 is plotted on the y-axis as a function of time (in seconds) on the x-axis. The data in the graph was generated by means of an FTIR method, which is well known in the art to which this invention applies and is described further in Jansen et al.: *Real-Time Infrared Determination of Photoinitiated Copolymerization Reactivity Ratios: Application of the Hilbert Transform and Critical Evaluation of Data Analysis Techniques*; Macromolecules 2004, 37, 2275-2286 (2004).

As can be seen from FIG. 2, now formulation 3, which utilizes a completely acrylate-functionalized system, is the fastest by % RAU metric. If the skilled artisan were only to consider the data provided in FIG. 2, she would be motivated to erroneously select formulation 3 as preferable to solve the problems of the current invention. This would be consistent with the well-known notions that acrylate-based systems are faster curing than methacrylate-based systems. However, Inventors have presently determined that a faster modulus buildup is a more important metric when assessing suitability for high line-speed optical fiber coating use.

Moreover, the surprising observation that formulation 1 exhibits enhanced suitability in high speed optical fiber coating applications (because of enhanced modulus build-up) is compounded by the fact that such a methacrylate/acrylate combination achieves similar or even lower modulus values than the comparable all-acrylate system. This is also a desirable characteristic in fiber optic coatings, as it tends to result in enhanced resistance to microbend-induced attenuation in the optical fiber with which such coating is associated.

Formulation 5, when compared with formulations 6-8, also demonstrates that with compositions according to the invention, a similar effect may be obtained using a different, slower-reacting reactive diluent monomer component (consisting of EHA). Formulations 16-25 further demonstrate the effect of the invention with respect to still further different reactive diluent monomers and in different amounts.

Formulations 28-37 demonstrate that the effect of the invention is not limited to one specific reactive oligomer; namely, different polyols and isocyanates can be used to similar effect.

Formulations 31, 38, and 39 show an improvement in cure speed and/or modulus at varying reactive diluent amounts, especially when compared with control formulation 30.

Formulations 40-44 exhibit that mixtures of different reactive diluents can be used, including those with polymerizable groups other than acrylate groups, such as acrylamides, N-vinyl amides, and mixtures thereof. Formulation 45 shows that reactive oligomer constituents comprising mixtures of methacrylate- and acrylate-functional reactive oligomers can also achieve improved performance, especially when compared with all-acrylate analogue formulation 3.

Figure 3:
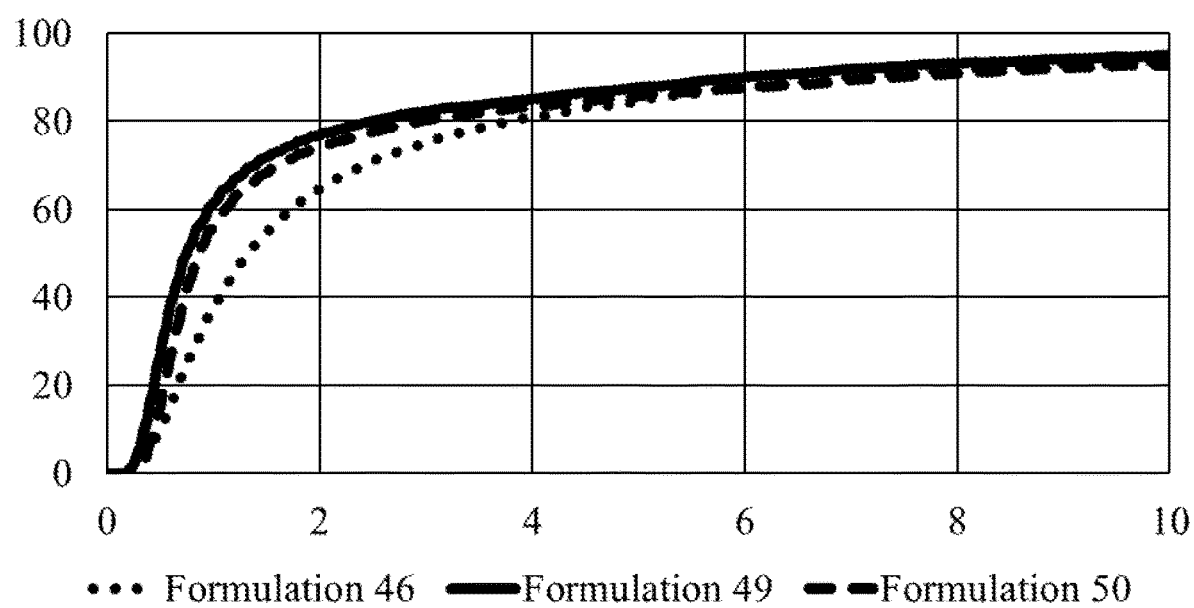
FIG. 3 shows a graph of the relative modulus based on G' max as a function of time for various radiation curable compositions tested herein (formulations 46, 49, and 50)

Table 3B, meanwhile, exhibits that compositions according to the current invention with multi-endcapped oligomers also demonstrate one or more of the technical effects. Surprisingly, certain multi-endcapped methacrylate-functional oligomers were shown to possess superior cure speed characteristics than an all-acrylate system (shown as example 46). The graphical results of this comparison of modulus build up are depicted in FIG. 3. Turning to FIG. 3, the relative modulus based upon G' max (in %) is plotted on the y-axis for three formulations (46, 49, and 50) as a function of time (in seconds) on the x-axis. Even though all formulations attain a comparable ultimate modulus build-up, formulations 49 and 50 achieve a significantly faster relative modulus buildup, suggesting a more-ready suitability for higher line processing speeds in optical fiber coating processes. Formulation 46, meanwhile, which is not according to the present invention, exhibits a comparatively worse modulus buildup.

Figure 4:
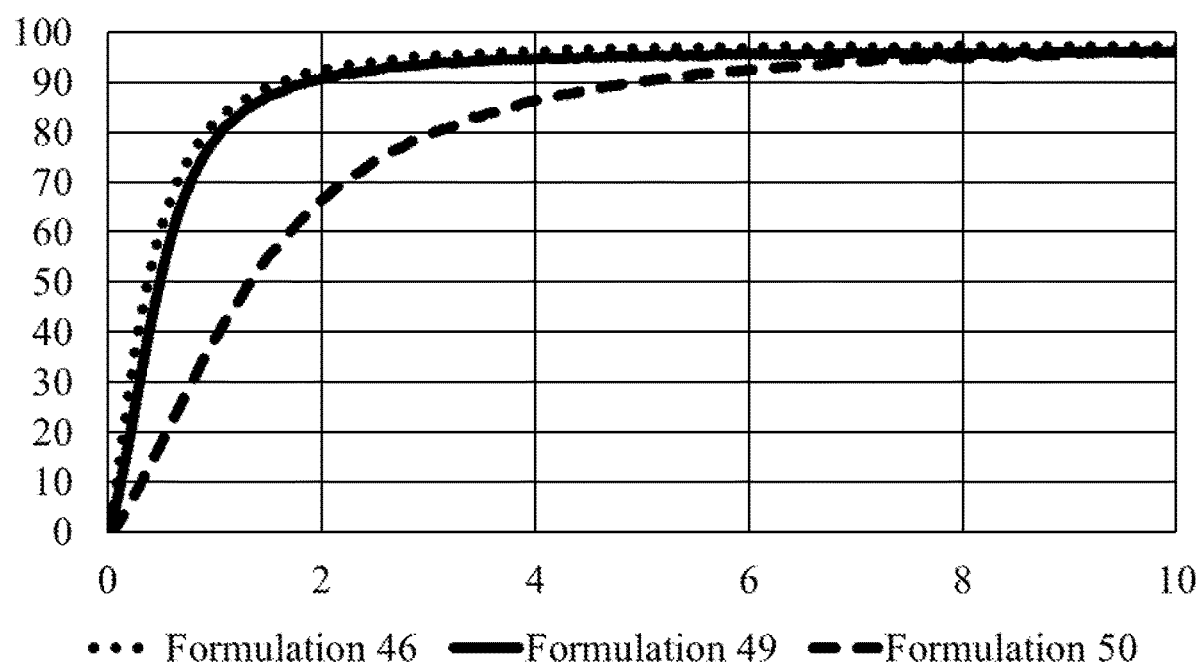
FIG. 4 shows a graph of the % reacted unsaturation of the same radiation curable compositions depicted in FIG. 3 as a function of time.

As discussed above with respect to FIGS. 1 and 2, the effect in FIG. 3 is even more surprising given the relative cure performance in terms of the % RAU metric for each formulation, which is represented in FIG. 4. Turning to FIG. 4, now non-inventive all-acrylate system formulation 46 appears fastest. Again, here, the skilled artisan would be dissuaded from using multi-endcapped methacrylate-inclusive formulations 49 and 50, even though Inventors have determined such compositions have improved suitability for use in coating optical fibers.

Furthermore with respect to Table 3B, it is further exhibited that mixtures of different reactive diluents in varying amounts can be used with positive effect, including those with polymerizable groups other than acrylate groups (such as formulations 63 through 67).

In Table 3C, the effect of the invention is still shown to be potentially realized by utilizing oligomers which are partially endcapped with a non-polymerizable group, such as a hydroxyl group. By way of example, formulation 69 shows the cure speed improvement effect that methacrylate-functionalized oligomer has over an acrylate-functionalized analogue, but formulation 73 further shows that by partially endcapping the oligomer with an —OH group, a comparable modulus build-up can be obtained while reducing G' value. Surprisingly, in contrast to the known inhibiting effect on cure speed that is observed when reducing overall functionality of acrylate-functionalized oligomers in this application, no similar effect was observed with respect to methacrylate-functionalized oligomers, such as when functionality was reduced from about 2 to about 1.5.

Figure 5:
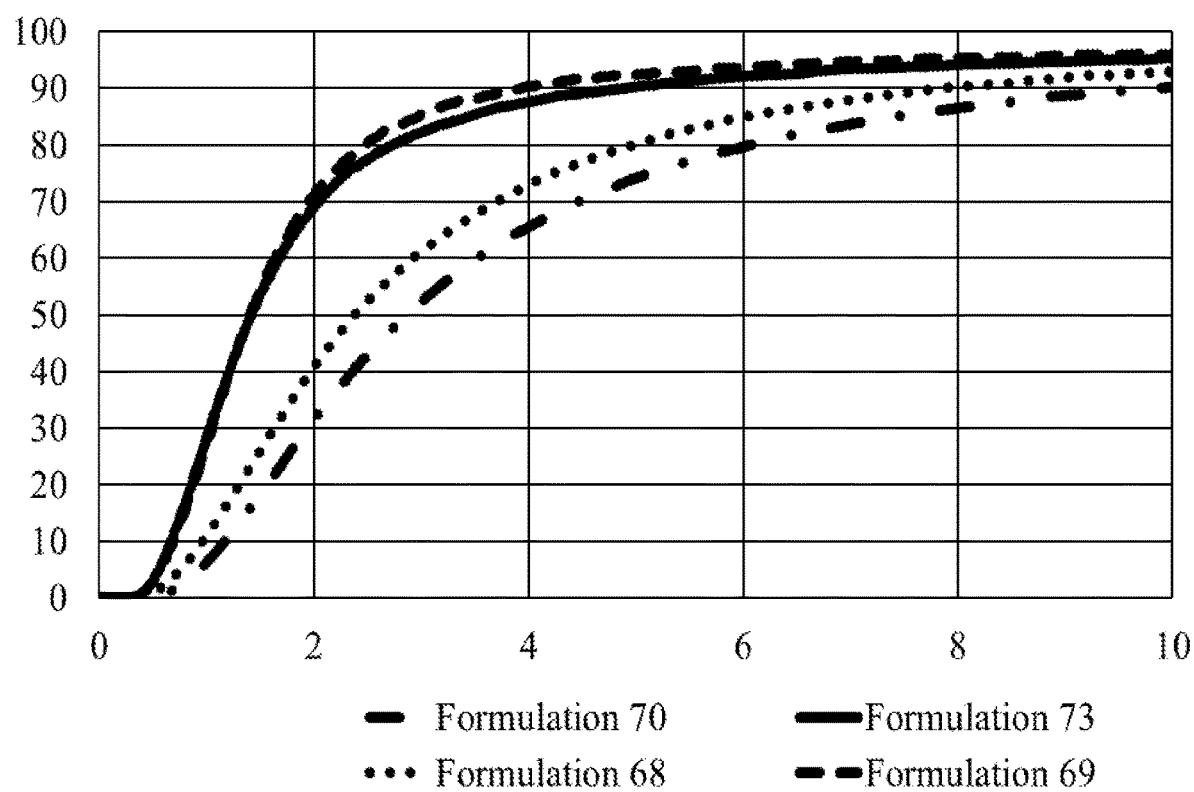
FIG. 5 shows a graph of the relative modulus based on G' max as a function of time for various radiation curable compositions tested herein (formulations 68, 69, 70, and 73)
Figure 6:
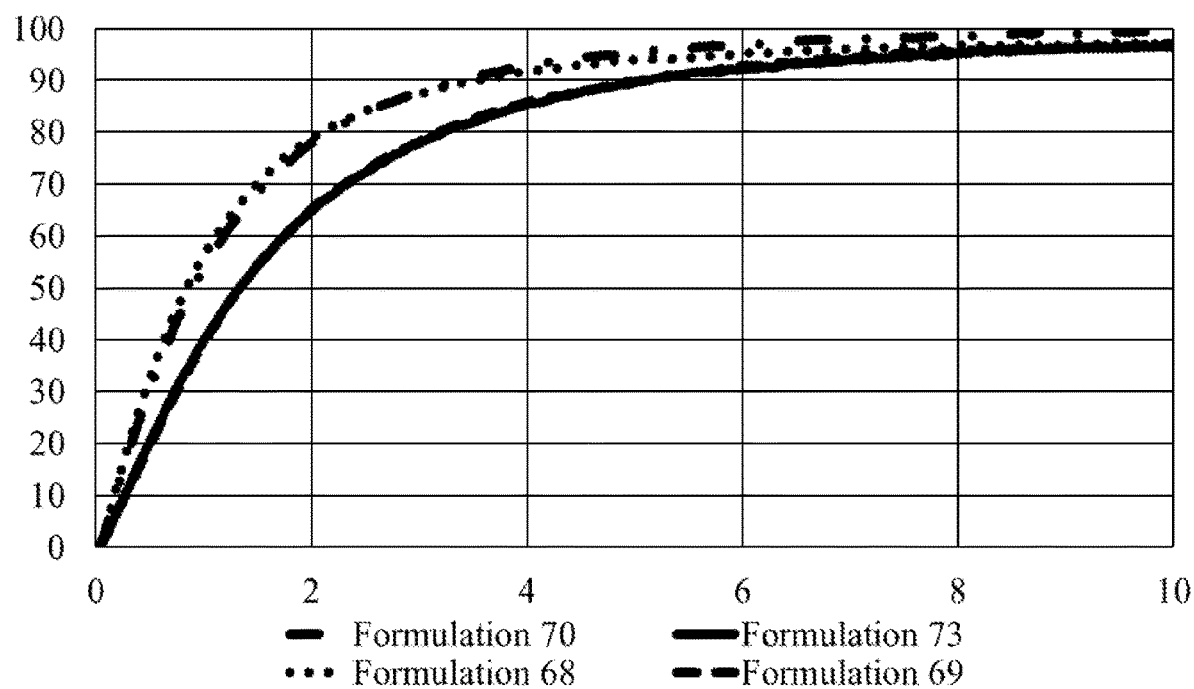
FIG. 6 shows a graph of the % reacted unsaturation of the same radiation curable compositions depicted in FIG. 5 as a function of time.

FIG. 5 and FIG. 6 exhibit the beneficial effect of such formulations graphically. Turning to FIG. 5, the modulus build-up (in a similar format and measurement per FIG. 1 above) of formulations 68-70 and 73 is depicted. Here, formulations 69 and 73 achieve a significantly faster relative modulus buildup, suggesting a more-ready suitability for higher line processing speeds in optical fiber coating processes. Formulations 68 and 70, which are not according to the invention, meanwhile, exhibit a comparatively worse modulus buildup. Furthermore, as shown in FIG. 6, such enhanced suitability of formulations 69 and 73 is especially surprising when witnessing the cure-speed as a function of % RAU metric (in the same format and measurement as per FIG. 2). This is because according to the % RAU metric alone, formulations 68 and 70 appear faster.

Turning to Table 3D, formulations 79-82 show the improved cure speed effect, as well as a marginal improvement in modulus, of methacrylate functionalized oligomers vs. acrylate functionalized oligomers (see 81 vs. 79 and 31 vs. 30). This effect is also seen when the functional groups appear along the oligomer backbone, as well as at the endgroups (see 82 vs. 80). In fact, the reactive oligomer with methacrylate functional endgroups and backbone groups possessed the fastest cure speed of all (82) in that series. Furthermore, it is noteworthy that formulation 80 (which possesses methacrylate functional groups along backbone and acrylate groups at endgroups) was also fast-curing, particularly when compared to an all-acrylate analogue (79). This shows the effect of the invention can be realized with even relatively lower molar fractions of methacrylate groups present in the reactive oligomer component.

Formulations 83-93 further demonstrate the generally improved effect of compositions according to the current invention. When comparing analogues 83, 84, 85, and 90, it is demonstrated that, for a given reactive diluent, methacrylate functionalization along either the backbone or endgroups of the oligomer is an improvement over a pure acrylate functionalization (see endgroups at 84 and backbone at 85 vs. 83), and that methacrylate functionalization along both the backbone and endgroup of the oligomer may induce the fastest modulus build-up improvement of all ($T_{30\%, \ modulus \ max}$ value of 90<85<84<83).

Formulations 86-93 demonstrate that methacrylate functionality has when placed along either the oligomer backbone or endgroups yields an improvement in cure speed over a purely acrylate-functionalized oligomer (86), even with different types, mixtures, and amounts of the reactive diluent component.

Figure 7:
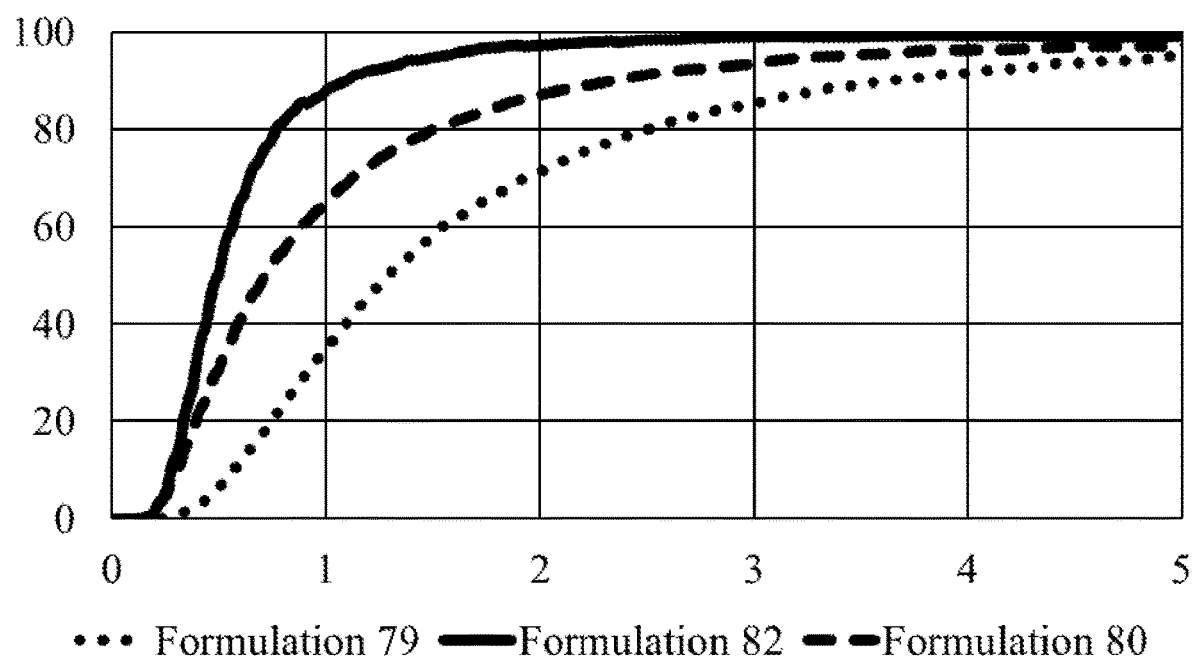
FIG. 7 shows a graph of the relative modulus based on G' max as a function of time for various radiation curable compositions tested herein (formulations 79, 80, and 82)
Figure 8:
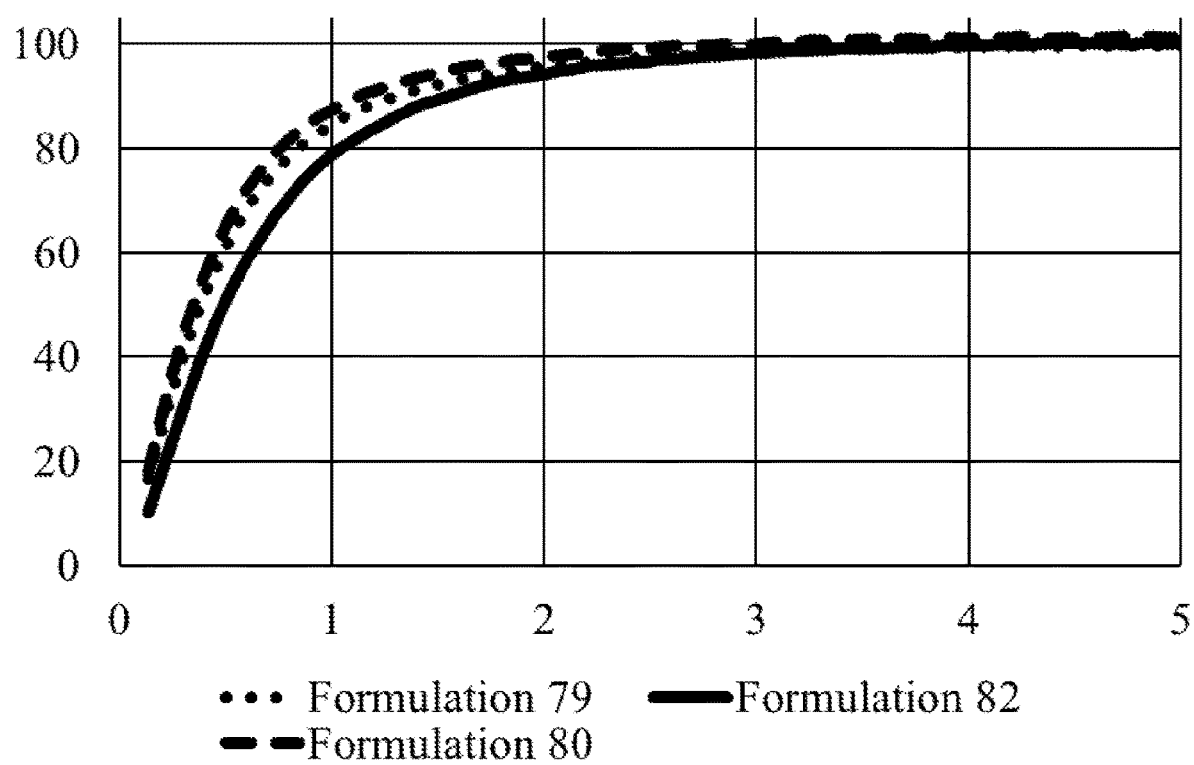
FIG. 8 shows a graph of the % reacted unsaturation of the same radiation curable compositions depicted in FIG. 7 as a function of time.

Yet a further graphical depiction highlighting the results of Table 3D is depicted as FIG. 7 and FIG. 8. Turning to FIG. 7, the modulus build-up (in a similar format and measurement per FIG. 1 above) of formulations 79, 80, and 82 is depicted. Here, formulations 80 and 82 achieve a significantly faster relative modulus buildup than the all-acrylate analogue formulation not according to the current invention (79). This suggests a more-ready suitability for higher line processing speeds in optical fiber coating processes. Furthermore, as shown in FIG. 8, such enhanced suitability is especially surprising when witnessing the cure-speed as a function of % RAU metric (in the same format and measurement as per FIG. 2). This is because according to the % RAU metric alone, formulation 79 now appears fastest.

Finally, in Table 3E, the effect of the invention is shown in even penta-functional oligomers possessing various molar fractions of methacrylate groups in the oligomer component. Here, it is shown that the all-acrylate control formulation 3 (which is repeated from Table 3A) possesses the slowest modulus build-up value when compared with other analogous formulations having varying degrees of methacrylate functionality in the oligomer component. It is shown that example 95, which has five polymerizable groups per oligomer (3 of which are methacrylate groups), exhibits the fastest modulus build-up of the entire series. Formulation 94, meanwhile, which also utilized a penta-functional oligomer (20% of the molar fraction of which included methacrylate groups) also exhibited an exceptional modulus build-up. The same effect in combination with a different reactive diluent monomer is shown with respect to examples 97-99 alongside repeated formulations 5, 7, 85, and 90.

Additional Exemplary Embodiments

The following additional exemplary embodiments are meant to further illustrate various potential aspects of the present invention. The invention is not intended to be limited to any embodiments described herein, and various combinations and/or variations of the following can be readily contemplated.

A first aspect of a first additional exemplary embodiment is a radiation curable composition comprising:

a reactive oligomer comprising one or more polymerizable groups; wherein at least one polymerizable group is a methacrylate group;

a reactive diluent monomer comprising a polymerizable group that is able to (co)polymerize with the polymerizable group(s) of the reactive oligomer; wherein at least one polymerizable group of the reactive diluent monomer is an acrylate group, acrylamide group, or N-vinyl amide group;

a photoinitiator component; and optionally, an additive component.

Another aspect of the first additional exemplary embodiment is the composition of the first aspect, wherein the composition comprises a reactive oligomer component consisting of reactive oligomers; and a reactive diluent monomer component consisting of reactive diluent monomers.

Another aspect of the first additional exemplary embodiment is the composition of either of the previous aspects of the first additional exemplary embodiment, wherein the reactive oligomer component comprises, consists essentially of, or consists of reactive urethane oligomers.

Another aspect of the first additional exemplary embodiment is the composition of any of the previous aspects of the first additional exemplary embodiment, wherein the reactive diluent monomer component comprises, consists of, or consists essentially of acrylate monomers.

Another aspect is the composition of the previous aspect, wherein the acrylate monomers comprise, consist of, or consist essentially of monofunctional acrylate monomers.

Another aspect of the first additional exemplary embodiment is the composition of any of the previous aspects of the first additional exemplary embodiment, wherein a molar ratio of methacrylate groups present in the entire composition to a total amount of polymerizable groups present in the entire composition is from 2% to 20%, or from 2% to 18%, or from 3% to 18%, or from, 4% to 20% or from 4% to 18%, or from 2% to 16%, or from 4% to 15%, or from 5% to 15%, or from 5% to 12%, or from 9% to 20%, or from 9% to 18%, or from 9% to 15%.

Another aspect of the first additional exemplary embodiment is the composition of any of the previous aspects, wherein at least 20%, or at least 30%, or at least 40%, or at least 50%, or at least 60%, or at least 70%, or at least 80%, or at least 90% of a molar fraction of polymerizable groups in the reactive oligomer or reactive oligomer component consist of methacrylate groups.

Another aspect of the first additional exemplary embodiment is the composition of any of the previous aspects, wherein the molar fraction of polymerizable groups is determined by a molar fraction calculation method described elsewhere herein using Mn, theo values.

Another aspect of the first additional exemplary embodiment is the composition of any of the previous aspects, wherein the molar fraction of polymerizable groups is determined by a molar fraction calculation method described elsewhere herein using Mn values.

Another aspect of the first additional exemplary embodiment is the composition of the previous aspect, wherein Mn values are determined according to an SEC method using a triple detector array as described elsewhere herein.

Another aspect of the first additional exemplary embodiment is the composition of any of the previous aspects, wherein the polymerizable groups in the reactive oligomer component consist of, or consist essentially of methacrylate groups.

Another aspect of the first additional exemplary embodiment is the composition of any of the previous aspects, wherein the polymerizable groups in the reactive oligomer component comprise, consist of, or consist essentially of polymerizable endgroups.

Another aspect of the first additional exemplary embodiment is the composition of any of the previous aspects, wherein the polymerizable groups in the reactive oligomer component comprise, consist of, or consist essentially of polymerizable backbone groups.

Another aspect of the first additional exemplary embodiment is the composition of any of the previous aspects, wherein the at least one reactive oligomer comprising a polymerizable group is the reaction product of a polyol compound, a diisocyanate compound, a hydroxyl-functional compound having at least one methacryloyl group, and optionally, a compound having at least one hydroxyl-group and no polymerizable group.

Another aspect of the first additional exemplary embodiment is the composition of any of the previous aspects, wherein the hydroxyl-functional compound having at least one methacryloyl group comprises two methacryloyl groups.

Another aspect of the first additional exemplary embodiment is the composition of any of the previous aspects, wherein the reactive oligomer component comprises monofunctional, difunctional, trifunctional, tetrafunctional, or pentafunctional reactive oligomers, or combinations thereof.

Another aspect of the first additional exemplary embodiment is the composition of any of the previous aspects, wherein at least 50%, or at least 60%, or at least 80%, or at least 90%, or at least 95%, or at least 98%, or at least 99%, of a molar fraction of polymerizable groups in the reactive diluent monomer component consist of acrylate groups, acrylamide groups, or N-vinyl amide groups.

Another aspect of the first additional exemplary embodiment is the composition of any of the previous aspects, wherein at least 50%, or at least 80%, or at least 90%, or at least 95%, or at least 98%, or at least 99%, of a molar fraction of polymerizable groups in the reactive diluent monomer component consist of acrylate, acrylamide groups, or N-vinyl caprolactam groups.

Another aspect of the first additional exemplary embodiment is the composition of any of the previous aspects, wherein at least 50%, or at least 60%, or at least 80%, or at least 90%, or at least 95%, or at least 98%, or at least 99%, of a molar fraction of polymerizable groups in the reactive diluent monomer component consist of acrylate groups.

Another aspect of the first additional exemplary embodiment is the composition of any of the previous aspects, wherein the molar fraction of polymerizable groups is determined by a molar fraction calculation method described elsewhere herein using Mn, theo values.

Another aspect of the first additional exemplary embodiment is the composition of any of the previous aspects, wherein the molar fraction of polymerizable groups is determined by a molar fraction calculation method described elsewhere herein using Mn values.

Another aspect of the first additional exemplary embodiment is the composition of the previous aspect, wherein Mn values are determined according to an SEC method using a triple detector array as described elsewhere herein.

Another aspect of the first additional exemplary embodiment is the composition of any of the previous aspects, wherein the reactive oligomer possesses a theoretical molecular weight (Mn, theo) of greater than 2000 g/mol, or greater than 4000 g/mol, or greater than 5000 g/mol.

Another aspect of the first additional exemplary embodiment is the composition of any of the previous aspects, wherein the reactive oligomer and/or the reactive oligomer component possess a number average molecular weight (Mn) of greater than 2000 g/mol, or greater than 4000 g/mol, or greater than 5000 g/mol, or greater than 6000 g/mol, or greater than 9000 g/mol, or from 2000 g/mol to 30,000 g/mol, or from 2000 g/mol to 20,000 g/mol, or from 4000 g/mol to 30,000 g/mol, or from 4000 g/mol to 20,000 g/mol, or from 6000 g/mol to 20,000 g/mol.

Another aspect of the first additional exemplary embodiment is the composition of any of the previous aspects, wherein Mn is determined according to an SEC method using a triple detector array as described elsewhere herein.

Another aspect of the first additional exemplary embodiment is the composition of any of the previous aspects, wherein the reactive diluent monomer component comprises, consists of, or consists essentially of reactive monomers possessing an Mn, theo or an Mn from 86 g/mol to 800 g/mol, or from 100 g/mol to 350 g/mol.

Another aspect of the first additional exemplary embodiment is the composition of any of the previous aspects, wherein the reactive diluent monomer comprises, consists of, or consists essentially of monofunctional monomers.

Another aspect of the first additional exemplary embodiment is the composition of any of the previous aspects, wherein, relative to the entire weight of the composition, the reactive oligomer component is present in an amount from 20 wt. % to 95 wt. %, or from 40 wt. % to 80 wt. %; the reactive diluent monomer component is present in an amount from 4 wt. % to 75 wt. %, or from 20 wt. % to 50 wt. %; the photoinitiator is present in an amount from 0.25 wt. % to 7 wt. %, or from 0.5 wt. % to 3 wt. %, or from 1 wt. % to 7 wt. %; and the additives are present in an amount from 0 wt. % to 50 wt. %.

Another aspect of the first additional exemplary embodiment is the composition of any of the previous aspects, wherein the additives comprise an adhesion promoter.

Another aspect of the first additional exemplary embodiment is the composition of any of the previous aspects, wherein the adhesion promoter comprises one or more of gamma-mercaptopropyltrimethoxysilane, trimethoxysiliylpropyl acrylate, tetraethoxysilane, or 3-trimetoxysilylpropane-1-thiol.

Another aspect of the first additional exemplary embodiment is the composition of any of the previous aspects, wherein the reactive oligomer comprises a silane coupling group.

Another aspect of the first additional exemplary embodiment is the composition of any of the previous aspects, wherein the composition is substantially free of particulate filler or nanoparticles, or contains less than 5 wt. %, or less than 3 wt. %, or less than 1 wt. % of particulate filler or nanoparticles.

A first aspect of a second additional exemplary embodiment is a radiation curable composition comprising a reactive oligomer; a reactive diluent monomer; an initiator; and optionally; additives; wherein the reactive oligomer is the reaction product of a compound having a polymerizable group; wherein in a copolymerization between the compound having at least one polymerizable group and 2-hydroxyethyl acrylate (HEA), a self-reactivity ratio of the compound having at least one polymerizable group ($RR_1$) is at least 1, or at least 1.3, or at least 1.4, or between 1 and 5, or between 1.4 and 3.5, or between 1.2 and 1.7.

An additional aspect of the second additional exemplary embodiment is the radiation curable composition of the first aspect, wherein a reactivity ratio of the compound having at least one polymerizable group with HEA ($RR_2$) is from 0.1 to 0.5, or from 0.1 to 0.4, or from about 0.15 to about 0.35.

An additional aspect of the second additional exemplary embodiment is the radiation curable composition of any of the aspects of the second additional exemplary embodiment, wherein $RR_1$ and $RR_2$ are determined according to multivariate analysis using the infrared spectra of the copolymer input compounds.

An additional aspect of the second additional exemplary embodiment is the radiation curable composition of any of the aspects of the second additional exemplary embodiment, wherein $$\frac{RR_1}{RR_2}$$

is greater than 1, or greater than 3, or greater than 5, or greater than 8, or from 2 to 12, or from 3 to 11, or from 10 to 12.

An additional aspect of the second additional exemplary embodiment is the radiation curable composition of any of the aspects of the second additional exemplary embodiment, wherein the reactive oligomer is a urethane oligomer, wherein the urethane oligomer is a reaction product of a polyol compound, a diisocyanate compound, and a hydroxyl-functional compound having a reactive group.

An additional aspect of the second additional exemplary embodiment is the radiation curable composition of any of the aspects of the second additional exemplary embodiment, wherein the hydroxyl-functional compound having at least one reactive group comprises 2-hydroxyethyl (meth)acrylate, caprolactone 2-(methacryloyloxy)ethyl ester, glycerol mono(meth)acrylate, glycerol acrylate methacrylate, or glycerol dimethacrylate.

An additional aspect of the second additional exemplary embodiment is the radiation curable composition of any of the aspects of the second additional exemplary embodiment, wherein the reactive diluent monomer comprises, consists of, or consists essentially of 2-ethylhexyl acrylate, 2-phenoxyethyl acrylate, 2-(2-ethoxyethoxy)ethyl acrylate, N-vinyl pyrrolidone, acryloyl morpholine, dimethylacryl-amide, N-vinylcaprolactam, ethoxylated 2-phenoxy ethyl acrylate, 4-hydroxy butyl acrylate, lauryl acrylate, isobornyl acrylate, caprolactone acrylate, isodecyl acrylate, or ethoxylated nonylphenol acrylate, or mixtures thereof.

An additional aspect of the second additional exemplary embodiment is the radiation curable composition of any of the aspects of the second additional exemplary embodiment, wherein the initiator comprises, consists of, or consists essentially of photoinitiators.

An additional aspect of the second additional exemplary embodiment is the radiation curable composition of any of the aspects of the second additional exemplary embodiment, wherein the additives comprise an adhesion promoter.

Another aspect of the second additional exemplary embodiment is the composition of any of the previous aspects, wherein the adhesion promoter comprises one or more of gamma-mercaptopropyltrimethoxysilane, trimethoxysiliylpropyl acrylate, tetraethoxysilane, or 3-trimetoxysilylpropane-1-thiol.

Another aspect of the second additional exemplary embodiment is the composition of any of the previous aspects, wherein the reactive oligomer comprises a silane coupling group.

An additional aspect of the second additional exemplary embodiment is the radiation curable composition of any of the aspects of the second additional exemplary embodiment, wherein the additives comprise an antioxidant, a polymerization inhibitor, a photosensitizer, a carrier surfactant, a tackifier, a catalyst, a stabilizer, a surface agent, and/or an optical brightener.

A first aspect of a third additional exemplary embodiment is a method for coating an optical fiber comprising: providing a glass optical fiber; applying a coating composition onto the surface of the glass optical fiber; imparting a dose of UV light to cure said coating composition; wherein the coating composition is a composition according to any of the aspects of either the first additional exemplary embodiment or the second additional exemplary embodiment.

A first aspect of a fourth additional exemplary embodiment is a coated optical fiber which is coated with a cured product of a composition according to any of the aspects of either the first additional exemplary embodiment or the second additional exemplary embodiment.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A radiation curable composition for coating an optical fiber comprising:
    a reactive oligomer component comprising at least one reactive urethane oligomer comprising a polymerizable group;
    wherein at least 20% of a molar fraction of the polymerizable groups in the reactive oligomer component consist of methacrylate groups;
    a reactive diluent monomer component comprising reactive diluent monomers having at least one polymerizable group that is able to (co)polymerize with the polymerizable group(s) of the reactive oligomer component; wherein the reactive diluent monomer component comprises a monofunctional acrylate monomer;
    wherein at least 50% of a molar fraction of the polymerizable groups of the reactive diluent monomer component consist of acrylate groups, acrylamide groups, N-vinyl amide groups, or mixtures thereof;
    a photoinitiator component; and
    optionally, an additive component.

2. The radiation curable composition of the previous claim, wherein the reactive urethane oligomer comprises a reaction product of
    a polyol compound;
    a diisocyanate compound; and
    a hydroxyl-functional compound having at least one methacryloyl group.

3. The radiation curable composition according to claim 1, wherein the reactive urethane oligomer and/or the reactive oligomer component possess a number average molecular weight (Mn) from 6000 g/mol to 20,000 g/mol; wherein Mn is determined according to an SEC method using a triple detector array as described elsewhere herein.

4. The radiation curable composition according to claim 1, wherein the reactive diluent monomer component comprises-monofunctional acrylate monomers possessing an Mn, theo or an Mn from 86 g/mol to 800 g/mol.

5. The radiation curable composition according to claim 2, wherein the reactive oligomer component comprises difunctional reactive oligomers.

6. The radiation curable composition according to claim 2, wherein the hydroxyl-functional compound having at least one methacryloyl group comprises two or greater than two methacryloyl groups.

7. The radiation curable composition of claim 6, wherein the reactive oligomer comprises, in at least two different locations, the reaction product of a hydroxyl-functional compound possessing two or greater than two methacryloyl groups.

8. The radiation curable composition according to claim 6, wherein the reactive oligomer component comprises trifunctional and/or tetrafunctional reactive oligomers.

9. The radiation curable composition according to claim 6, wherein the hydroxyl-functional compound having two or greater than two methacryloyl groups comprises 1,2-glycerol dimethacrylate, 1,3-glycerol dimethacrylate, or combinations thereof.

10. The radiation curable composition according to claim 1, wherein at least one polymerizable group is a polymerizable backbone group.

11. The radiation curable composition according to claim 1, wherein the hydroxyl-functional compound having at least one methacryloyl group comprises 2-hydroxyethyl methacrylate, caprolactone 2-(methacryloyloxy)ethyl ester, or glycerol monomethacrylate, or combinations thereof.

12. The radiation curable composition according to claim 1, wherein the reactive oligomer comprises a plurality of polymerizable groups, wherein the polymerizable groups comprise polymerizable endgroups and polymerizable backbone groups.

13. The radiation curable composition according to claim 12, wherein the reactive oligomer component comprises pentafunctional reactive oligomers.

14. The radiation curable composition according to claim 1, wherein, by molar fraction, at least 30% of the polymerizable groups of the reactive oligomer component consist of methacrylate groups.

15. The radiation curable composition according to claim 1, wherein the polymerizable groups of the reactive oligomer component consist of or consist essentially of methacrylate groups.

16. The radiation curable composition according to claim 1, wherein the polymerizable groups of the reactive diluent monomer component consist of or consist essentially of acrylate groups.

17. The radiation curable composition according to claim 1, wherein a molar fraction of methacrylate groups present in the entire composition to a total amount of polymerizable groups present in the entire composition is from 2% to 16%.

18. The radiation curable composition according to claim 17, wherein a molar ratio of acrylate groups to methacrylate groups in the entire composition is from 4:1 to 50:1.

19. The radiation curable composition according to claim 2, wherein, relative to the entire weight of the composition,
the reactive oligomer component is present in an amount from 20 wt. % to 95 wt. %;
the reactive diluent monomer component is present in an amount from 4 wt. % to 75 wt. %;
the photoinitiator is present in an amount from 0.25 wt. % to 7 wt. %; and
the additives are present in an amount from 0 wt. % to 50 wt. %.

20. The radiation curable composition according to claim 19, wherein at least one of conditions (a), (b), (c), or (d) applies:
(a) the polyol compound comprises a polyether, polyester, polycarbonate, polyamide, polycaprolactone, or acrylic moiety;
(b) the diisocyanate compound comprises isophorone diisocyanate, 2,4-isomer toluene diisocyanate, 2,4- and/or 4,4'-methylenedicyclohexyl diisocyanate, methylenediphenyl diisocyanate, tetramethylxylene diisocyanate, (hydrogenated) xylylene diisocyanate, 1,5-pentane diisocyanate, 2,2,4-trimethyl-hexamethylene diisocyanate, 2,4,4-trimethyl-hexamethylene diisocyanate, or hexamethylene diisocyanate, or combinations thereof;
(c) the hydroxyl-functional compound having at least one methacryloyl group is a methacrylate compound, and comprises 2-hydroxyethyl methacrylate, caprolactone 2-(methacryloyloxy)ethyl ester, or combinations thereof; and/or
(d) the compound having a hydroxyl group and no polymerizable group comprises n-butanol, 2-ethyl hexanol, benzyl alcohol, or combinations thereof.

21. The radiation curable composition according to claim 19, wherein the reactive diluent monomer component comprises 2-ethylhexyl acrylate, 2-phenoxyethyl acrylate, 2-(2-ethoxyethoxy)ethyl acrylate, n-vinyl pyrrolidone, acryloyl morpholine, dimethylacryl-amide, n-vinylcaprolactam, ethoxylated 2-phenoxy ethyl acrylate, 4-hydroxy butyl acrylate, lauryl acrylate, isobornyl acrylate, caprolactone acrylate, isodecyl acrylate, or ethoxylated nonylphenol acrylate, or mixtures thereof.

22. The radiation curable composition according to claim 19, wherein the photoinitiator comprises, consists of, or consists essentially of 4-methyl benzophenone, 2,4,6-trimethyl benzophenone, dimethoxybenzophenone, 1-hydroxycyclohexyl phenyl ketone, phenyl(1-hydroxyisopropyl)ketone, 2-hydroxy-1-[4-(2-hydroxyethoxy)phenyl]-2-methyl-1-propanone, and 4-isopropylphenyl(1-hydroxyisopropyl) ketone, benzil dimethyl ketal, oligo-[2-hydroxy-2-methyl-1-[4-(1-methylvinyl)phenyl]propanone]; 2,4,6-trimethylbenzoyl diphenylphosphine oxide, 2,4,6-trimethylbenzoyl phenyl, bis(2,4,6-trimethylbenzoyl)-phenylphosphineoxide, 2-methyl-1-[4-(methylthio)phenyl]-2-morpholinopropanone-1, 2-benzyl-2-(dimethylamino)-1-[4-(4-morpholinyl)phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis (diethylamino)benzophenone, or 4,4'-bis(N,N-dimethylamino)benzophenone (Michler's ketone).

23. The radiation curable composition according to claim 19, wherein the additives comprise an adhesion promoter.

24. The radiation curable composition according to claim 23, wherein the adhesion promoter comprises mercaptopropyltrimethoxysilane, trimethoxysilyl propyl acrylate, tetraethoxysilane, or 3 trimethoxysilyl propane-1-thiol.

25. The radiation curable composition according to claim 19, wherein the additives comprise an antioxidant, a polymerization inhibitor, a photosensitizer, a carrier surfactant, a tackifier, a catalyst, a stabilizer, a surface agent, and/or an optical brightener.

26. The radiation curable composition according to claim 1, wherein the composition possesses a $T_{30\%, \text{modulus max}}$ value from 0.3 to 1.5 seconds, wherein the $T_{30\%, \text{modulus max}}$ value is measured by procedures as described herein, and/or wherein the composition possesses a maximum modulus (G') value of less than 0.5 MPa, wherein the G' value is measured by procedures as described herein.

27. The radiation curable composition according to claim 1, wherein in a copolymerization between the compound having at least one methacryloyl group and 2-hydroxyethyl acrylate (HEA),
a self-reactivity ratio of the compound having at least one methacryloyl group ($R_1$) is between 1 and 5, or between 1.4 and 3.5;
wherein, $R_1$ is determined according to multivariate analysis using the infrared spectra of the copolymer input compounds.

28. The radiation curable composition according to claim 27, wherein a reactivity ratio of the compound having at least one methacryloyl group with HEA ($R_2$) is from 0.1 to 0.5, or from about 0.15 to about 0.35;
wherein, $R_2$ is determined according to multivariate analysis using the infrared spectra of the copolymer input compounds.

29. The radiation curable composition according to claim 28, wherein $$\frac{R_1}{R_2}$$

is from 3 to 11.

30. The radiation curable composition according to claim 1, wherein, by molar fraction, at least 50% of the polymerizable groups of the reactive oligomer component consist of methacrylate groups; and at least 90% of the molar fraction of the polymerizable groups of the reactive diluent monomer component consist of acrylate groups, acrylamide groups, N-vinyl amide groups, or mixtures thereof.

* * * * *